United States Patent
Nakajima

(10) Patent No.: US 6,212,137 B1
(45) Date of Patent: Apr. 3, 2001

(54) MAGNETO-OPTICAL RECORDING MEDIUM BY MAGNETIC FIELD MODULATION WITH THE USE OF SMALLER MAGNETIC FIELDS

(75) Inventor: Junsaku Nakajima, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/324,266

(22) Filed: Jun. 2, 1999

(30) Foreign Application Priority Data

Jun. 4, 1998 (JP) .................................................. 10-156308

(51) Int. Cl.⁷ ...................................................... G11B 11/00
(52) U.S. Cl. ........................................ 369/13; 428/694 ML
(58) Field of Search .............................. 369/13, 14, 110, 369/116, 275.2; 360/59, 114; 428/694 ML, 694 MM, 694 SC, 694 MT, 694 RE

(56) References Cited

U.S. PATENT DOCUMENTS 4,794,560 * 12/1988 Bell et al. ............................ 369/13
4,893,910 * 1/1990 Birecki ................................. 369/13
5,130,958 * 7/1992 Fukami et al. ..................... 369/13

FOREIGN PATENT DOCUMENTS 63-204533    8/1988   (JP) .
5-182278     7/1993   (JP) .

* cited by examiner

*Primary Examiner*—Tan Dinh
(74) *Attorney, Agent, or Firm*—Dike, Bronstein, Roberts & Cushman, LLP; David G. Conlin; George W. Hartnell, III

(57) ABSTRACT

A storage medium includes at least a storage layer, a non-magnetic layer, a storage supplementary layer, an anti-oxidation layer, and a ferromagnetism material layer provided in this or reverse order on a substrate. Owing to a magnetic field produced by the storage supplementary layer with an external magnetic field and the concentration of a magnetic flux caused by the ferromagnetism material layer, the magnetic field is strengthened at the position of the storage layer, and the magnetic field sensitivity of the storage medium is improved. In a magneto-optical disc device, an optical head having an objective lens and a magnetic head having a coil are disposed on the same side with respect to the storage medium to store information onto the storage medium.

20 Claims, 26 Drawing Sheets

FIG. 1
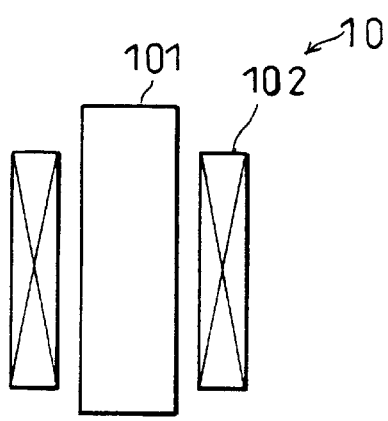
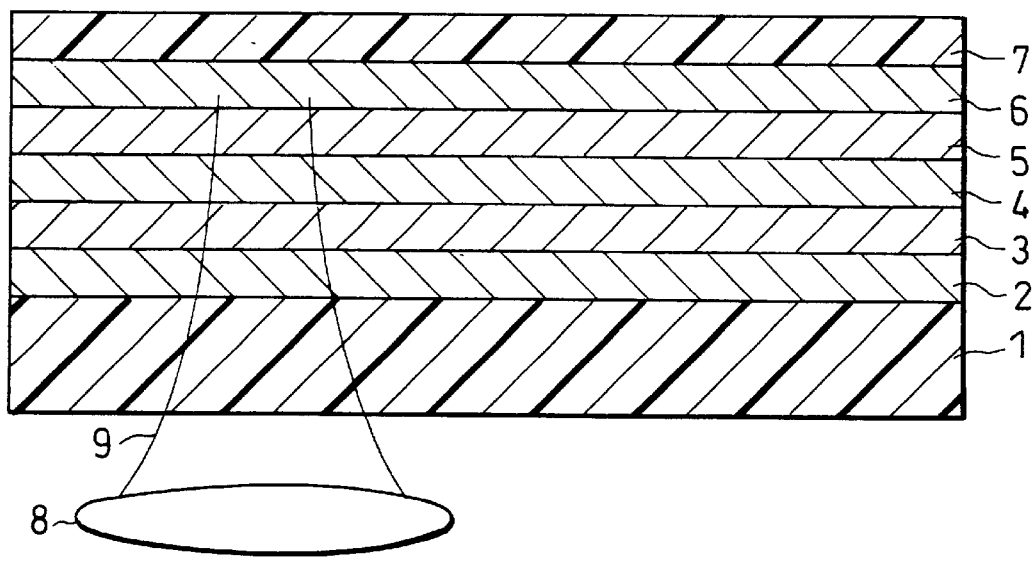

FIG.5(a)
FIG.5(b) PRIOR ART
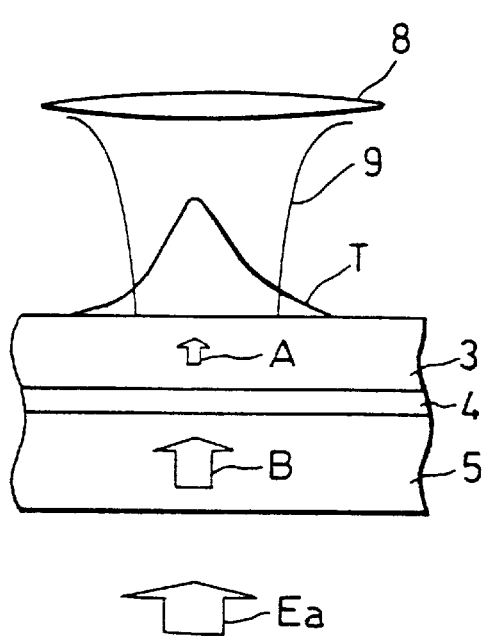
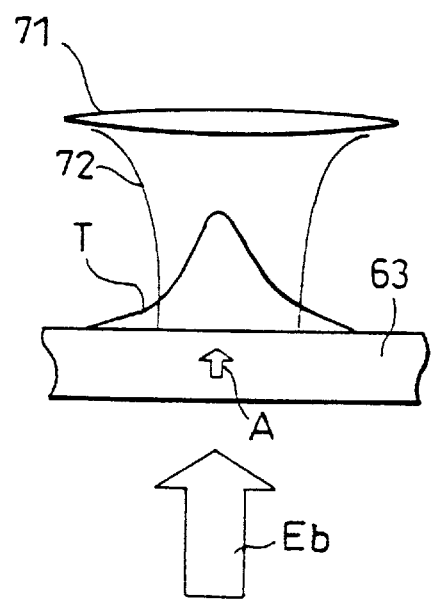

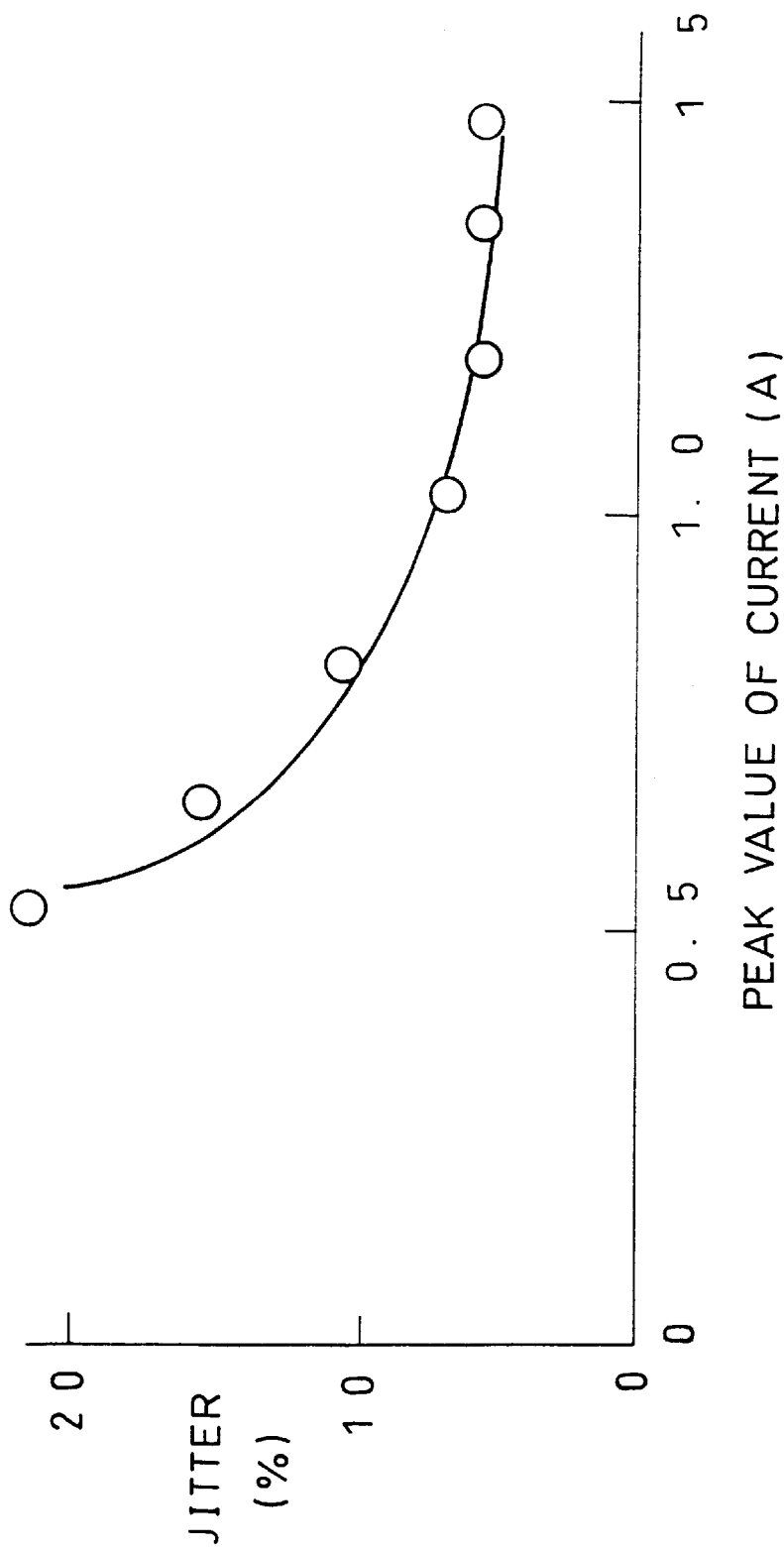

MAGNETO-OPTICAL RECORDING MEDIUM BY MAGNETIC FIELD MODULATION WITH THE USE OF SMALLER MAGNETIC FIELDS

FIELD OF THE INVENTION

The present invention relates to a magneto-optical storage medium, such as a magneto-optical disc, used as an information storage medium, and also to a magneto-optical storage device therefor.

BACKGROUND OF THE INVENTION

In recent years, magneto-optical discs boast increasingly high storage density features as computer storage devices and package media for music and image information. Information is written on a magneto-optical disc by either of the following two methods: an optical modulation method of storing information by modulating light intensity of a laser beam according to the information, and a magnetic field modulation method of storing information by modulating an external magnetic field according to the information. The magnetic field modulation method yields a higher storage density than the optical modulation method, and is adopted in many of the commercialised magneto-optical storage and reproduction devices.

According to the magnetic field modulation method, a high frequency magnetic field needs be applied to a storage film of the medium, and a magnetic head therefore needs be disposed in a proximity of the storage film. For these reasons, as shown in FIG. 25, a conventional storage medium includes a translucent dielectric layer 62, a storage layer 63, a non-magnetic layer 64, a reflection layer 65, and a protection layer 66 provided in this order on a translucent substrate 61. A magneto-optical storage and reproduction device includes an optical head (not shown) and a magnetic head 70. The optical head has an objective lens 71, and structured to emit a light beam 72 onto the magneto-optical disc from the side on which the translucent substrate 61 is provided. The magnetic head 70 is constituted by a magnetic core 701 and a coil 702. Since the translucent substrate 61 is as thick as about 1 mm, the magnetic head 70 is provided on the opposite side to the optical head with respect to the translucent substrate 61 so as to be positioned near the storage layer 63.

If the magnetic head is provided on the opposite side to the optical head with respect to the storage medium as noted above, problems occur that the device increases in size and that a pasted disc cannot be used.

Also, if the magnetic head is provided on the same side as the optical head with respect to the storage medium, problems occur that the magnetic field produced by the magnetic head at the position of the storage layer becomes smaller and that information cannot be stored.

By contrast, Japanese Laid-Open Patent Application No. 63-204533/1988 (Tokukaisho 63-204533) discloses an arrangement in which a optical head and a magnetic head coil are provided on the same side with respect to the storage medium, and a ferromagnetic material is provided either on the opposite side to the optical head and the magnetic head coil with respect to the storage medium or in the storage medium.

That conventional arrangement has an object to prevent an external magnetic field flux from diverging when information is being stored on the storage medium. However, a large electric power is essential to store information on the storage medium, and no commercialised usages has been established so far.

Another conventional approach is to use no external magnetic field in a storing operation. For example, Japanese Laid-Open Patent Application No. 5-182278/1993 (Tokukaihei 5-182278) discloses a direct overwrite method by use of a storage layer and a supplementary layer, and a medium to work the method.

However, in the case of the storing on a magneto-optical storage medium, storage density can be more readily improved with magnetic field modulation than with optical modulation, and there is a popular demand for memory with a larger capacity. Accordingly, a storage medium, device, and method for magnetic field modulation which can use both sides of the disc need be developed.

SUMMARY OF THE INVENTION

The present invention has objects to provide a magneto-optical storage medium that is capable of storing information with a smaller external magnetic field, and to offer a low power-consuming magneto-optical storage device for storing information on such a magneto-optical storage medium with optical and magnetic heads disposed on the same side with respect to the magneto-optical storage medium.

To achieve the above objects, a magneto-optical storage medium in accordance with the present invention is characterised in that it includes:

a storage layer having a coercive force that decreases with a rise in temperature;

a storage supplementary layer made of a ferrimagnetic material having a compensation temperature near room temperature and exhibiting an increased saturation magnetisation near a Curie point of the storage layer, and having a magnetisation that changes an orientation thereof at a portion of the storage supplementary layer according to a modulated external magnetic field, the portion having been heated in a storing operation; and a first non-magnetic layer disposed between the storage layer and the storage supplementary layer.

With the above arrangement, the magnetic moment of the storage supplementary layer heated in a storing operation follows a small external magnetic field, and produces a relatively large magnetic field at the position of the storage layer. Therefore, even if the applied external magnetic field is small, owing to the relatively large magnetic field produced by the magnetic moment of the storage supplementary layer at the position of the storage layer, the magnetic moment of the storage layer follows the external magnetic field.

Typically, according to a magnetic field modulation method, information is stored by reducing the coercive force of the storage layer with heat and then applying an external magnetic field modulated according to the information that is to be stored to reverse the magnetisation of the storage layer in accordance with the orientation of the external magnetic field. Therefore, with the magneto-optical storage medium in accordance with the present invention can store information with a small external magnetic field.

This enables the magneto-optical storage medium to store information with a smaller magnetic field than a conventional magneto-optical storage medium, and the device for storing information onto the magneto-optical storage medium with a magnetic field modulation method to be driven with a reduced amount of electric power.

Moreover, the magneto-optical storage medium preferably further includes a ferromagnetic material layer disposed, via a second non-magnetic layer, on a side of the storage supplementary layer on which the first non-magnetic layer is not provided.

With the above arrangement, the additional provision of the ferromagnetic material layer via the second non-magnetic layer on a side of the storage supplementary layer on which the first non-magnetic layer is not provided, i.e., the existence of the ferromagnetic material layer in the storage medium, causes concentration of a magnetic flux, and therefore enables information to be stored with an even smaller external magnetic field.

This enables the magneto-optical storage medium to store information with a smaller magnetic field than a conventional magneto-optical storage medium, and the device for storing information onto the magneto-optical storage medium with a magnetic field modulation method to be driven with a reduced amount of electric power. Moreover, this enables information to be stored by using a device (generally, regarded as being capable of producing only a small magnetic field at the position of the storage layer) in which optical and magnetic heads are disposed on the same side with respect to the magneto-optical storage medium.

Furthermore, a magneto-optical storage device in accordance with the present invention is a magneto-optical storage device for storing information on a magneto-optical storage medium including: a storage layer having a coercive force that decreases with a rise in temperature; a storage supplementary layer made of a ferrimagnetic material having a compensation temperature near room temperature and exhibiting an increased saturation magnetisation near a Curie point of the storage layer, and having a magnetisation that changes an orientation thereof at a portion of the storage supplementary layer according to a modulated external magnetic field, the portion having been heated in a storing operation; a first non-magnetic layer disposed between the storage layer and the storage supplementary layer; and a ferromagnetic material layer disposed, via a second non-magnetic layer, on a side of the storage supplementary layer on which the first non-magnetic layer is not provided, and is characterised in that the magneto-optical storage device includes:
an optical head; and
a magnetic head disposed on the same side as the optical head with respect to the magneto-optical storage medium.

Since the magneto-optical storage medium is capable of storing information with a smaller magnetic field than a conventional magneto-optical storage medium, a magneto-optical storage device can be used that includes an optical head and a magnetic head disposed on the same side of the magneto-optical storage medium as in the foregoing arrangement.

This enables the magneto-optical storage device to be fabricated in a smaller size, and to be used with a pasted disc.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a schematic view illustrating a data storing mechanism of a storage medium of the first embodiment in accordance with the present invention by using a magneto-optical disc device that emits light from the side on which the substrate is provided.

FIG. 5(a) is an explanatory drawing illustrating a data storing mechanism of the storage medium, and FIG. 5(b) is an explanatory drawing illustrating a data storing mechanism of a conventional storage medium.

FIG. 13 is a graph showing storing sensitivity of the storage medium of the first embodiment in accordance with the present invention when the magneto-optical disc device is used.

DESCRIPTION OF THE EMBODIMENTS

[Embodiment 1]

Figure 2:
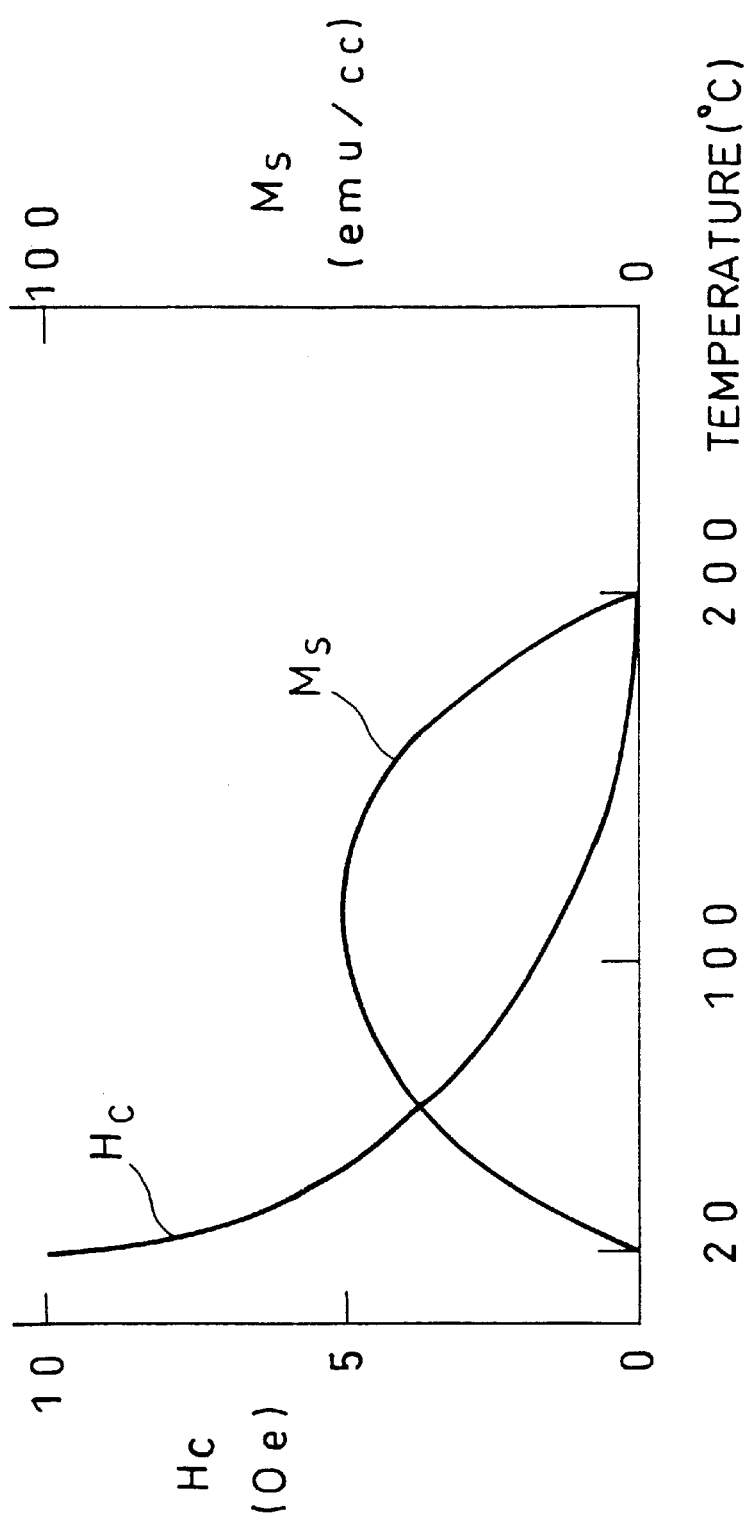
FIG. 2 is a graph showing magnetic properties of a storage layer of the storage medium.

Referring to FIGS. 1 through 9, the following description will discuss an embodiment in accordance with the present invention.

FIG. 1 is a schematic view illustrating an information storing mechanism of a storage medium (magneto-optical storage medium) of the present embodiment by using a magneto-optical disc device. The storage medium includes a translucent dielectric layer 2, a storage layer 3, a non-magnetic layer (first non-magnetic layer) 4, a storage supplementary layer 5, and an anti-oxidation layer (second non-magnetic layer) 6, and a protection layer 7 provided in this order on a substrate 1. The substrate 1 is made of a polycarbonate and has a thickness of 1.2 mm. The translucent dielectric layer 2 is made of AlN and has a thickness of 80 nm, the storage layer 3 is made of DyFeCo and has a thickness of 30 nm, the non-magnetic layer 4 is made of AlN and has a thickness of 20 nm, the storage supplementary layer 5 is made of GdFeCo and has a thickness of 250 nm, the anti-oxidation layer 6 is made of AlN and has a thickness of 40 nm, and the protection layer 7 is made of ultraviolet-ray curing resin and has a thickness of 5 $\mu$m.

FIG. 2 shows magnetic properties of DyFeCo used for the storage layer 3: namely, temperature dependencies of a coercive force $H_c$ and a saturation magnetisation $M_s$.

According to the magnetic field modulation method, information is typically stored by reducing the coercive force of the storage layer with heat produced by a laser beam emitted onto to the storage layer and then applying an external magnetic field modulated according to the information that is to be stored to the storage layer to reverse the magnetisation of the storage layer in accordance with the orientation of the external magnetic field. Since the coercive force of the external magnetic field decreases with higher temperatures, and reaches zero at the Curie point, the temperature of the storage layer needs be in a proximity of the Curie point to store information.

For these reasons, information is stored on the storage layer 3 at temperatures in the proximity of the Curie point, i.e. 200° C., of the storage layer 3. Therefore, the storage layer 3 is heated to about 200° C. to reduce the coercive force $H_c$, and then an external magnetic field is applied to store the information.

Figure 3:
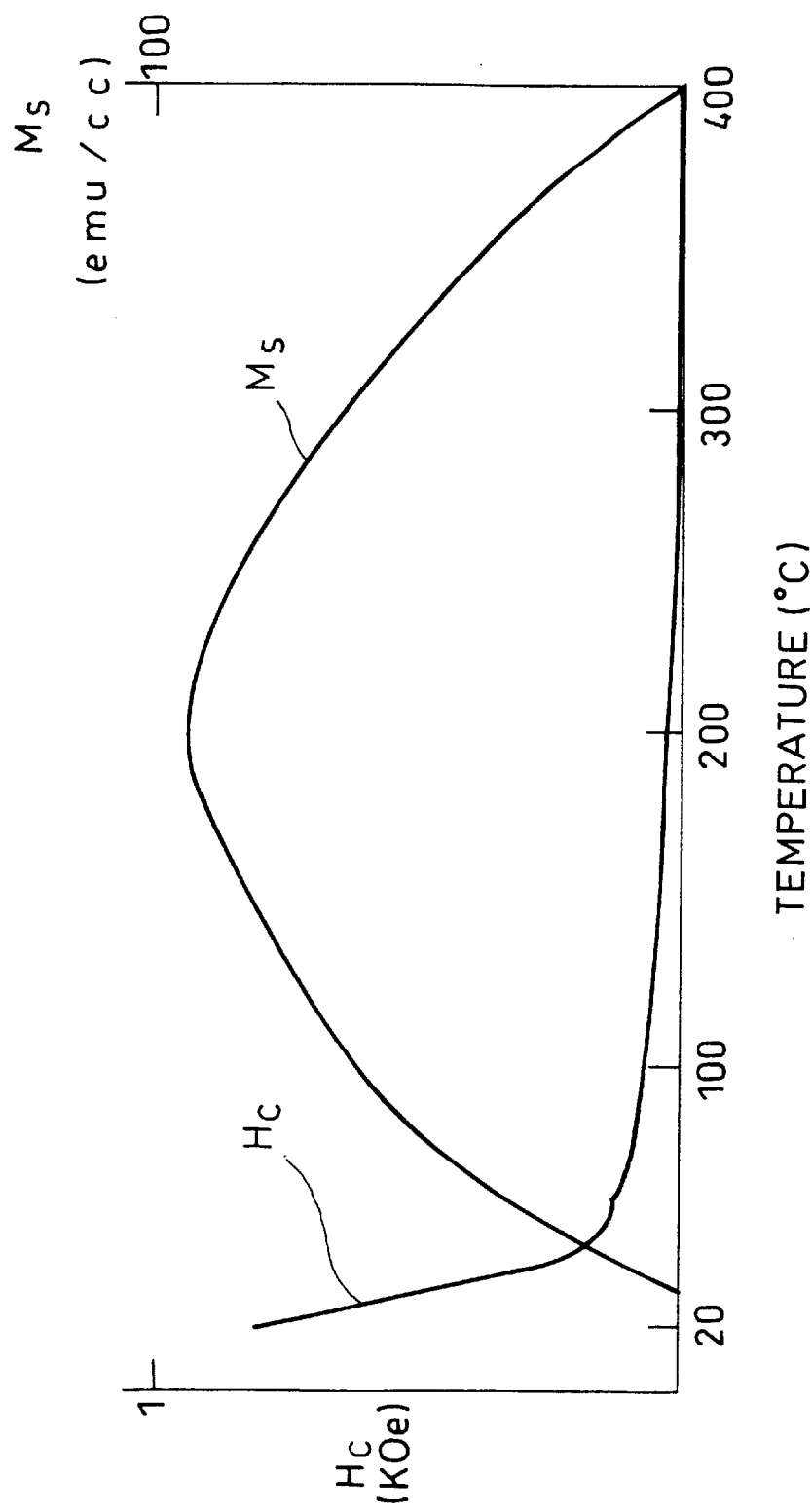
FIG. 3 is a graph showing magnetic properties of a storage supplementary layer of the storage medium.

FIG. 3 shows magnetic properties of GdFeCo used for the storage supplementary layer 5. The storage supplementary layer 5 has a compensation temperature near room temperature like the storage layer 3, but is adjusted so as to have a higher Curie point than that of the storage layer 3 and to have a smaller coercive force $H_c$ than that of the storage layer 3 at the same temperature. The storage supplementary layer 5 shows a great saturation magnetisation $M_s$ in the proximity of the Curie point, i.e. 200° C., of the storage layer 3. Note that although GdFeCo is taken here as a mere example of the material for the storage supplementary layer 5, any ferri-magnetic material can be used, as long as it has properties such that the compensation temperature is near room temperature, and that the saturation magnetisation increases in a proximity of the Curie point, i.e. 200° C., of the storage layer 3.

Subsequently, as shown in FIG. 1, the magneto-optical disc device for storing information on the storing medium stores the information by emitting a light beam 9 via the objective lens 8 of an optical head (not shown) onto the substrate 1 of the storage medium and then driving a magnetic head 10 disposed on the opposite side to the optical head with respect to the storage medium. The magnetic head 10 is constituted by a ferrite magnetic core 101 and a coil 102.

Figure 4:
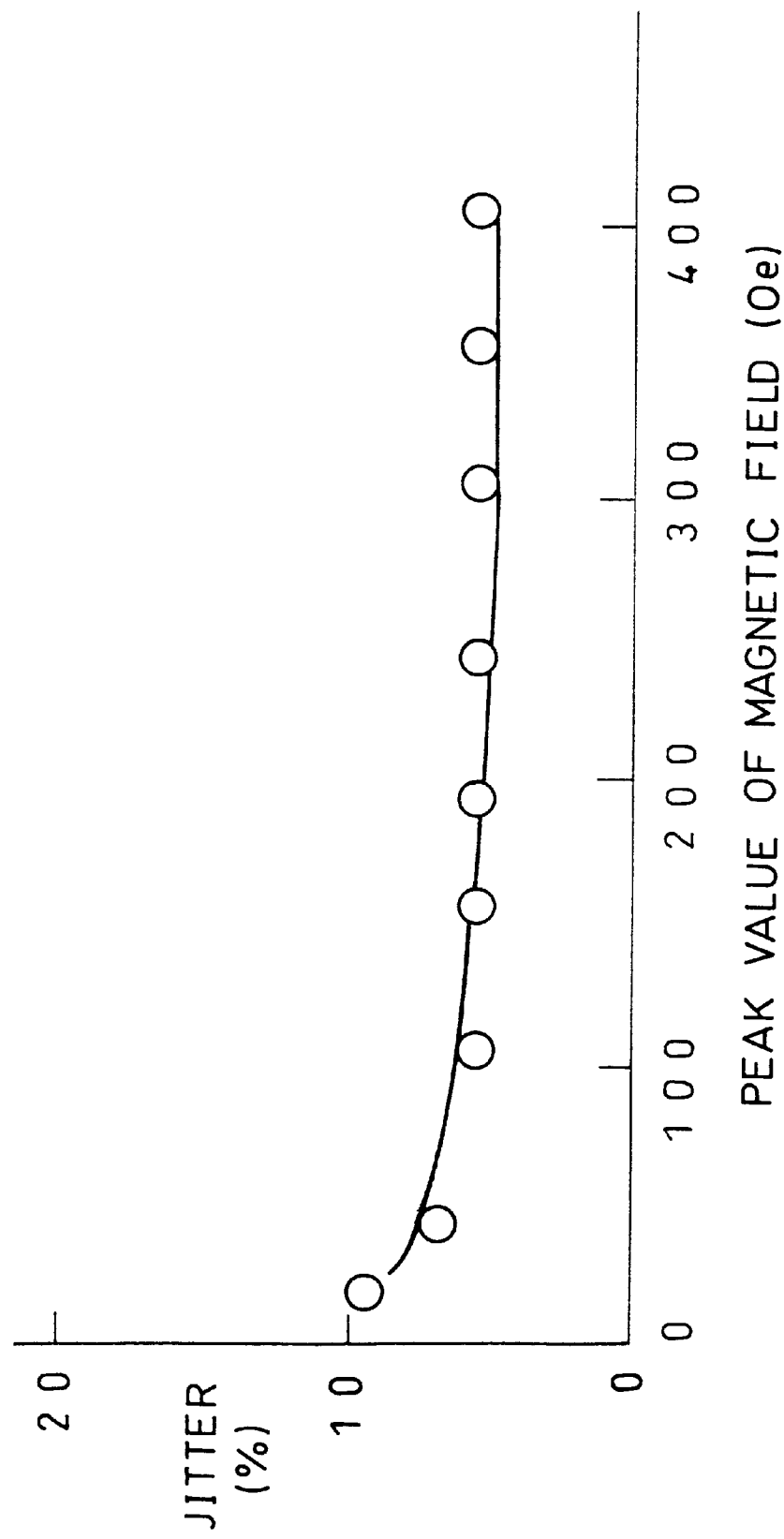
FIG. 4 is a graph showing storing sensitivity of the storage medium.

FIG. 4 is a graph showing the relationship between the peak values of a high frequency magnetic field and the jitters when information is stored with magnetic field modulation, where random data of 8/16 modulation with the shortest mark being 0.6 $\mu$m is stored, and the linear velocity of the disc is specified to 6 m/sec. The shortest mark is written at a storage frequency of 5 MHz.

As understood from FIG. 4, peak values, of an externally applied magnetic field, greater than 50 Oe suppresses the jitter to an satisfactory level, enabling good storing. The laser power required in such a case is about 11 mW, and a current required to produce a magnetic field of 50 Oe is about 0.05 A.

Figure 25:
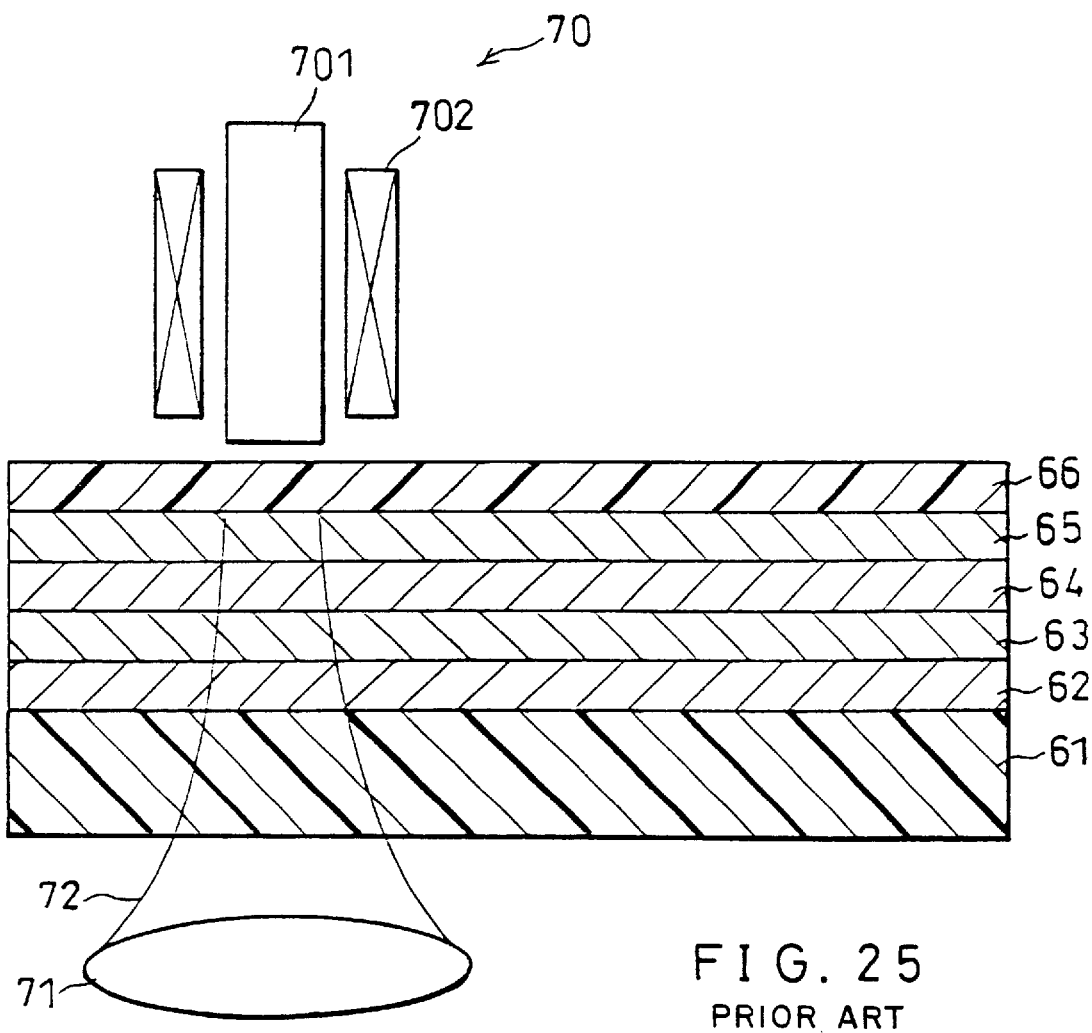
FIG. 25 is a schematic view illustrating a data storing mechanism of a conventional storage medium by using a conventional magneto-optical disc device that emits light from the side on which the substrate is provided.

Here, for comparison with a storage medium of the present embodiment, the peak values of a high frequency magnetic field and the jitters were measured using a conventional magneto-optical disc device and storage medium shown in FIG. 25. The storage medium, as mentioned earlier, includes a translucent dielectric layer 62, a storage layer 63, a non-magnetic layer 64, a reflection layer 65, and a protection layer 66 provided in this order on a translucent substrate 61. The conventional storage medium includes neither a storage supplementary layer 5 nor an anti-oxidation layer 6, which are provided to the storage medium of the present embodiment, but instead includes the above-noted reflection layer 65, which is not provided to the storage medium of the present embodiment. The reflection layer 65 is made of an Al alloy and has a thickness of 30 mm. The translucent substrate 61, the translucent dielectric layer 62, the storage layer 63, the non-magnetic layer 64, and the protection layer 66 are respectively the same as the substrate 1, the translucent dielectric layer 2, the storage layer 3, the non-magnetic layer 4, and the protection layer 7 of the storage medium of the present embodiment.

Also in the magneto-optical disc device, the optical head (not shown), provided with the objective lens 71, for emitting the light beam 72, and the magnetic head 70 provided with the magnetic core 701 and the coil 702 are structured in the same manner as the optical head and the magnetic head 10 of the present embodiment.

Figure 26:
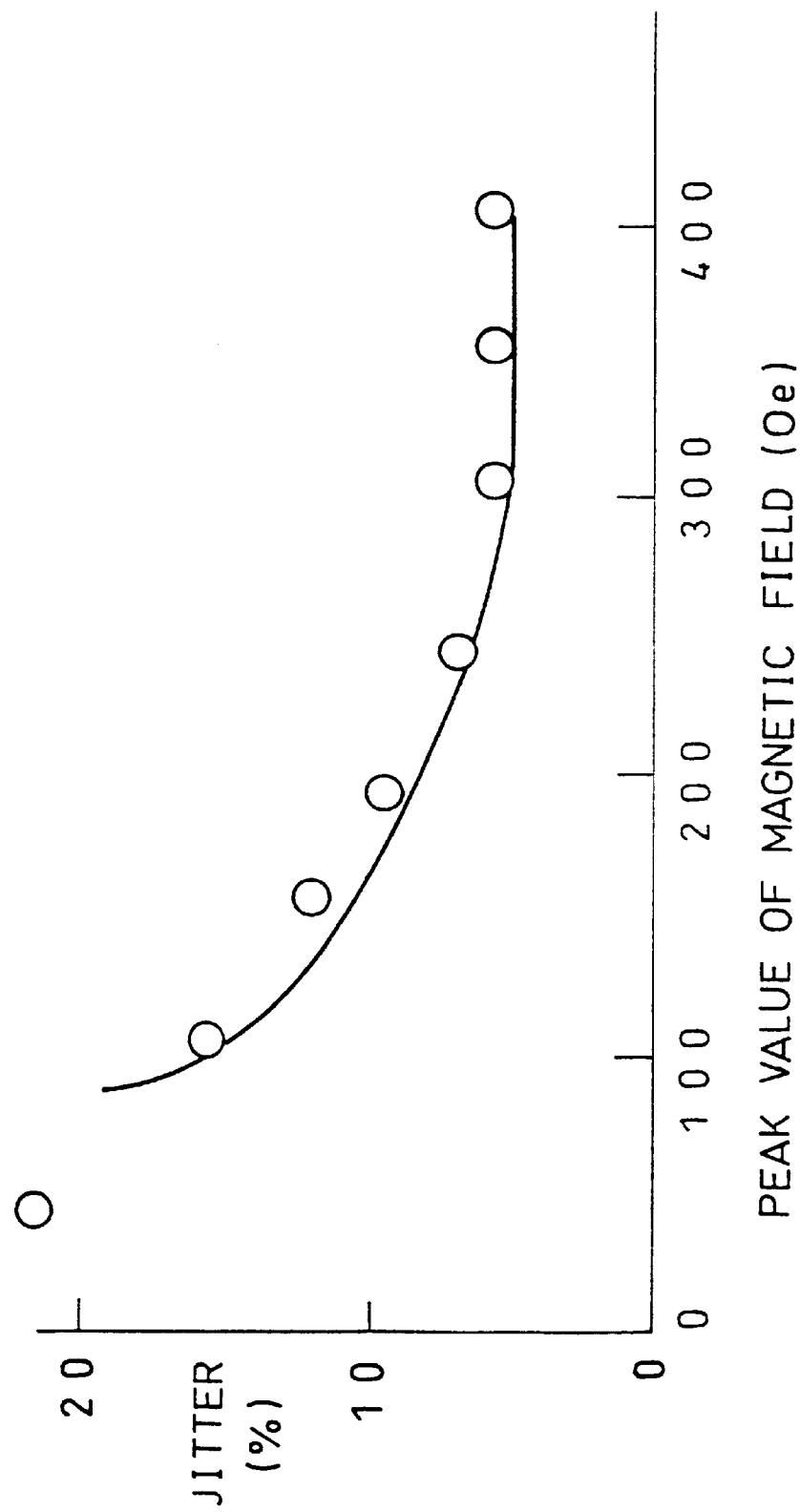
FIG. 26 is a graph showing storing sensitivity of a conventional storage medium.

FIG. 26 shows results of examination of the peak values of a high frequency magnetic field and the jitters in the same manner as in the present embodiment. As understood from FIG. 26, in order to realise good storing with the smallest jitter, a conventional storage medium requires a peak value of the magnetic field of 300 Oe or greater, which is by far greater than the peak values of the magnetic field required by the storage medium of the present embodiment. The laser power required in such a case is about 7 mW, which is smaller than in the case of the storage medium of the present embodiment. To produce a magnetic field of 300 Oe required by the conventional storage medium to realise good storing, a current of about 0.3 A, a value greater than that required in the case of the present embodiment, is required.

As detailed so far, the storage medium of the present embodiment shows great improvements on the magnetic field sensitivity upon storing in comparison with a conventional storage medium. The following description will explain the reasons for the great improvements on the magnetic field sensitivity upon storing by the storage medium of the present embodiment.

FIG. 5(a) is an explanatory drawing illustrating a data storing mechanism of the storage medium of the present embodiment, and FIG. 5(b) is an explanatory drawing illustrating a data storing mechanism of the conventional storage medium.

As shown in FIG. 5(b), a portion of the storage layer 63 which is irradiated with the light beam 72 is heated and shows a temperature distribution T shown in FIG. 5(b). The magnetic moment A of the storage bit (storage layer 63) where information is to be stored is oriented according to the external magnetic field Eb, enabling the information to be stored. The external magnetic field Eb required here is the magnetic field peak value.

As shown in FIG. 5(a), a portion of the storage supplementary layer 5 which is irradiated with the light beam 9 is heated and shows a temperature distribution T shown. Then the storage supplementary layer shows a large saturation magnetisation $M_s$. Therefore, the magnetic moment B of the storage supplementary layer 5 right beneath the magnetic moment A of the storage layer 3 increases, and has an orientation according to the relatively small external magnetic field Ea. Since the magnetic moment A of the storage layer 3 is electrostatically coupled with the magnetic moment B of the storage supplementary layer 5 via the non-magnetic layer 4, the magnetic moment A of the storage layer 3 is oriented according the small external magnetic field Ea in the same manner as is the magnetic moment B. For these reasons, in FIG. 5(a), if the external magnetic field Ea is reversed to realise magnetic field modulation storing, the magnetic moment B is also reversed in accordance with the external magnetic field Ea, and the magnetic moment A, being electrostatically coupled with the magnetic moment B, is reversed in the same manner, enabling the information to be stored on the storage layer 3.

For these reasons, the storage medium of the present embodiment can reduce the magnitude of the jitter sufficiently to such a level to enable good storing, with a small magnetic field peak value.

This can also be interpreted in the following manner. The magnetic moment B of the storage supplementary layer 5 follows the small external magnetic field Ea, and produces a relatively great magnetic field at the position of the storage layer 3. Therefore, the magnetic moment A of the storage layer 3 follows the magnetic field produced by the magnetic moment B of the storage supplementary layer 5.

Figure 6:
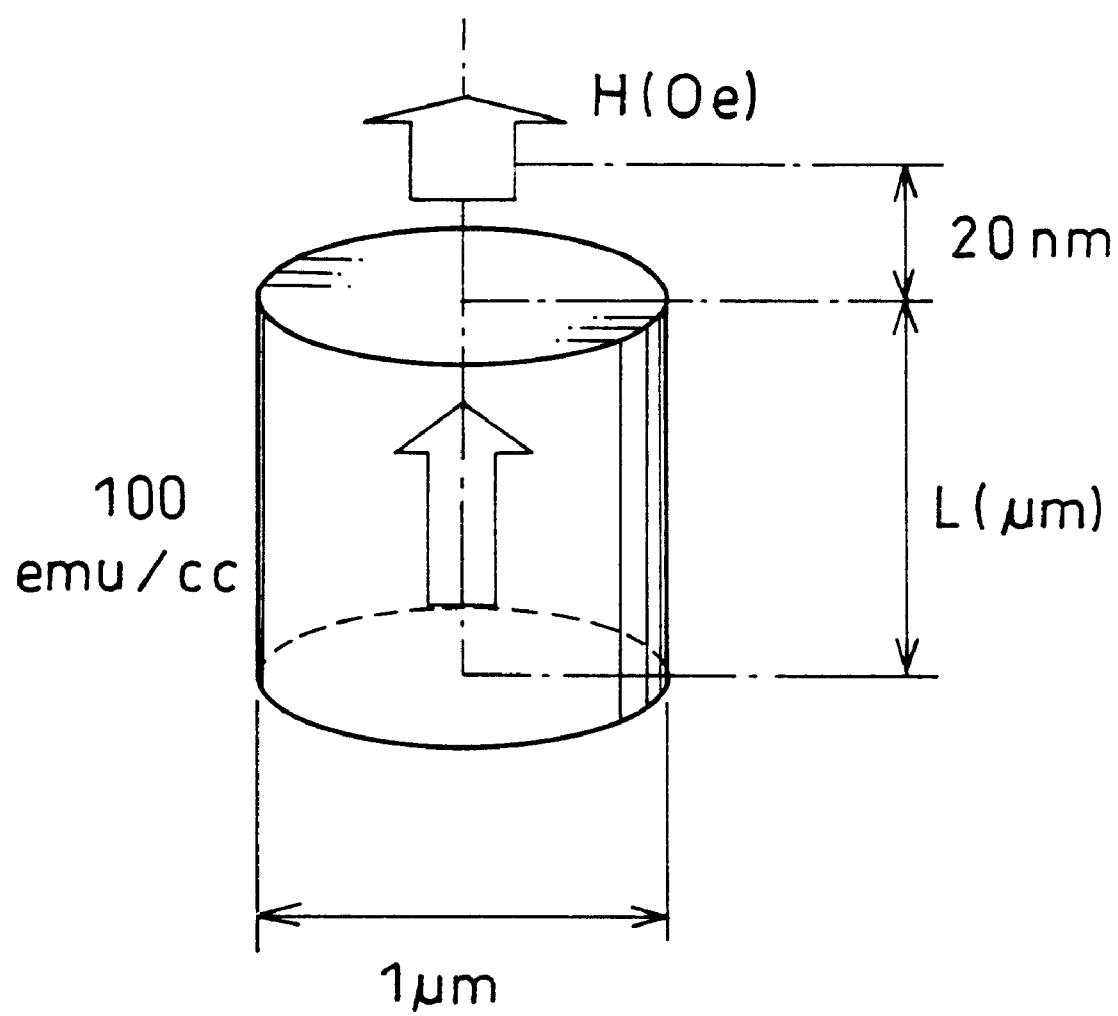
FIG. 6 is an explanatory drawing illustrating the magnitude of a magnetic field produced by a hypothetical cylindrical magnetic body.

Here, in order to obtain the magnitude of the magnetic field produced by the magnetic moment B of the storage supplementary layer 5, a hypothetical cylindrical magnetic body shown in FIG. 6 is taken that has a diameter of 1 µm and a length of L(µm). It is assumed that the saturation magnetisation $M_s$ of the magnetic body is 100 emu/cc, which is approximately equal to that of the storage supplementary layer 5.

Figure 7:
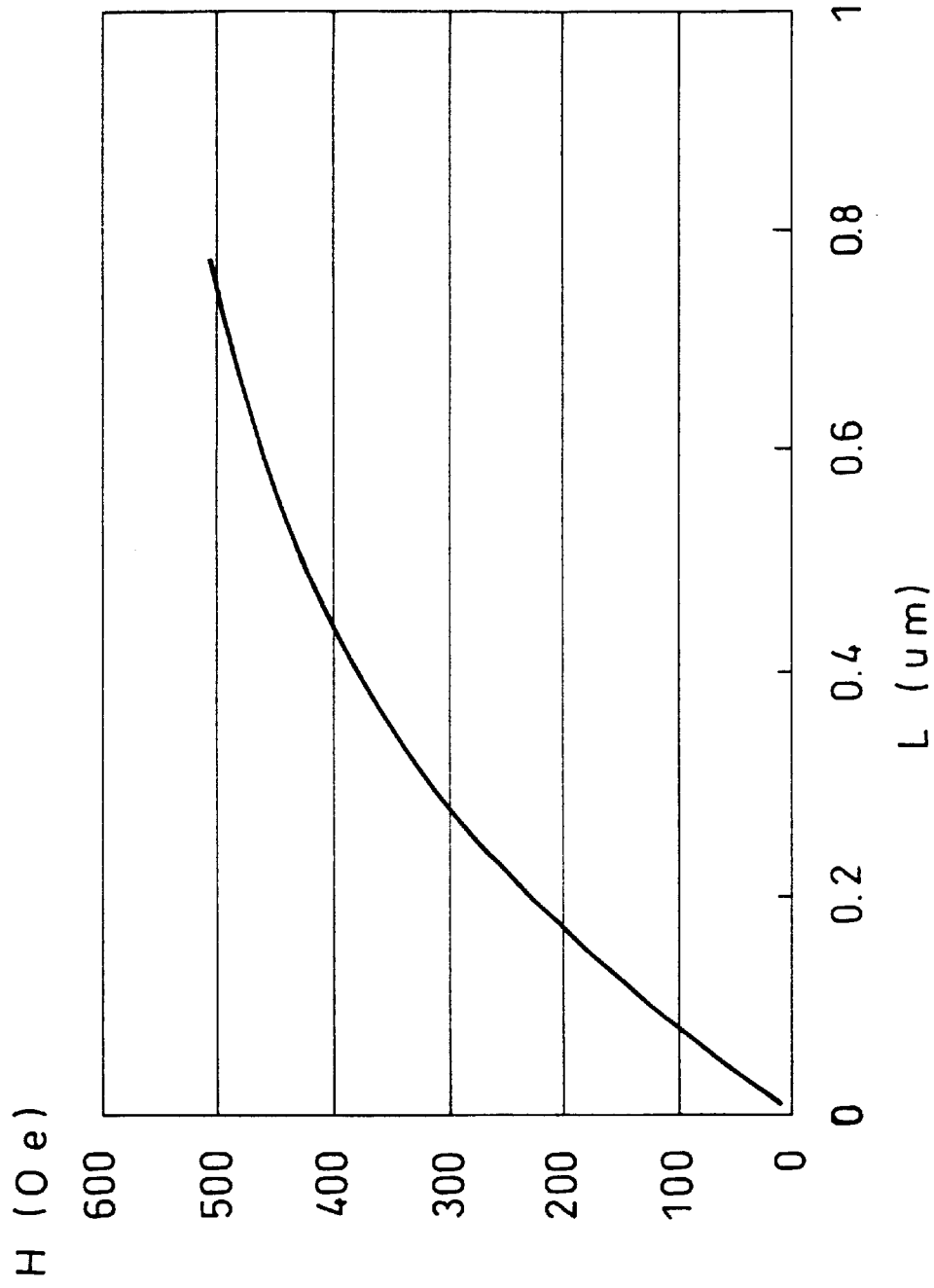
FIG. 7 is a graph showing the relationship between the length of the cylindrical magnetic body and the magnitude of a magnetic field produced by the magnetic body.

FIG. 7 shows results of calculations for the relationship between the L and the magnetic field H produced 20 nm upward along the axis of the cylinder from the bottom. It is understood from these results that if the L is about 0.25 µm, a magnetic field H of about 250 Oe is produced with the magnetic body.

Since in the present embodiment, the storage supplementary layer 5 has a thickness of about 250 nm (0.25 µm), and the saturation magnetisation $M_s$ at the storing temperature is 100 emu/cc, it can be assumed that the magnetic moment B of the storage supplementary layer 5 produces a magnetic field of about 250 Oe at the position of the storage layer 3. Although the peak value of the external magnetic field Ea applied in the above manner is only 50 Oe, the addition of the magnetic field produced by the storage supplementary layer 5 to the external magnetic field Ea renders the effective peak value of the magnetic field applied to the storage layer 3 equal to approximately 250+50=300 (Oe).

For these reasons, the storage medium of the present embodiment shows great improvements on the magnetic field sensitivity upon storing. The reason why the storage medium of the present embodiment requires a large laser power in comparison with a conventional storage medium is that the storage supplementary layer 5 is heated as well as the storage layer 3.

Figure 8:
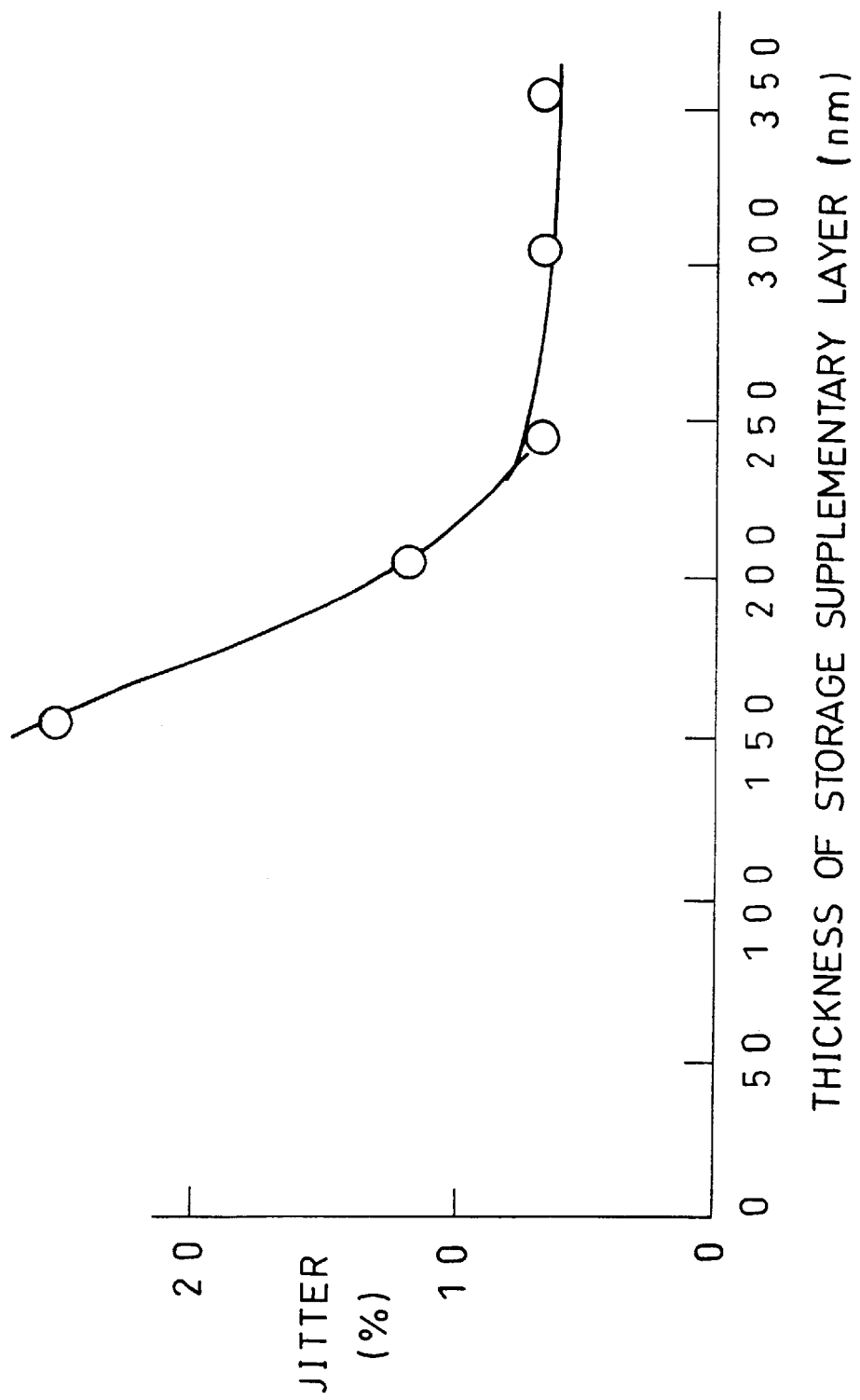
FIG. 8 is a graph showing the relationship between the thicknesses of a storage supplementary layer and the jitters.

FIG. 8 shows the relationship between the jitters and the thicknesses of the storage supplementary layer 5 when the peak value of the external magnetic field is set to 50 Oe. It is understood from this that the storage supplementary layer 5 should have a thickness of about 250 nm or greater to reduce the magnitude of the jitter sufficiently to such a level to enable good storing.

As explained earlier in reference to FIGS. 6 and 7, it is also understood that a thinner storage supplementary layer 5 reduces the magnetic field produced at a storing position (at the position of the storage layer 3) by the magnetic moment B of the storage supplementary layer 5, and therefore makes it impossible to realise good storing.

As explained so far, the storage medium of the present embodiment produces a greater magnetic field at the position of the storage layer 3 due to the inclusion of the storage supplementary layer 5, and therefore has a better magnetic field sensitivity than a conventional storage medium, thereby being capable of storing information with a smaller external magnetic field and saving power-consumption.

Figure 9:
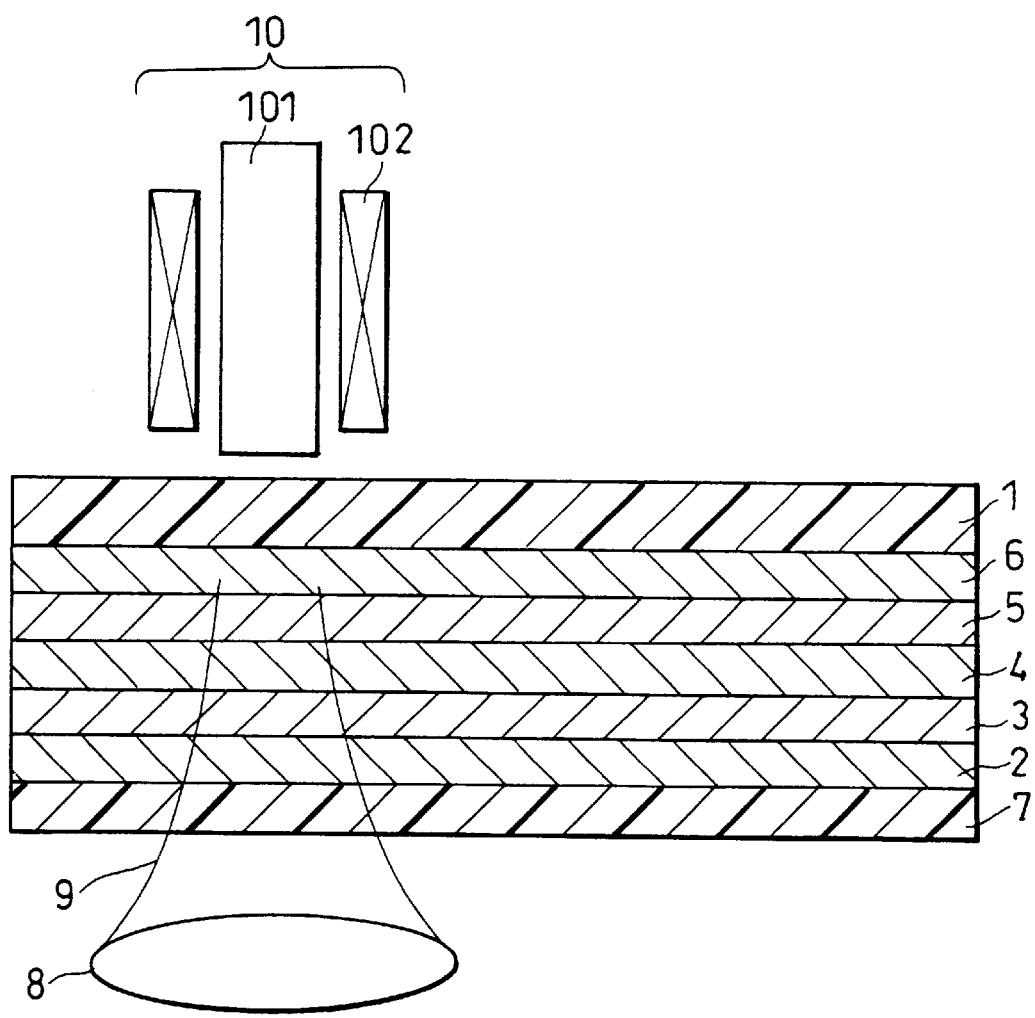
FIG. 9 is a schematic view illustrating a data storing mechanism of a storage medium, which is a variant of the first embodiment in accordance with the present invention, by using a magneto-optical disc device that emits light from the side on which the protection layer is provided.

Note that the same advantages as those in the case of FIG. 1 can be achieved in the case of FIG. 9 where information is stored and reproduced on a storage medium that includes a substrate 1 laminated with a non-magnetic layer 6, a storage supplementary layer 5, a non-magnetic layer 4, a storage layer 3, a translucent dielectric layer 2, and a protection layer 7 provided in this order on the substrate 1, using a light beam 9 emitted onto the storage medium from the side on which the protection layer 7 is provided. Also note in the case of FIG. 9 that since the light beam 9 is incident on the side on which the protection layer 7 is provided, the substrate 1 does not need to be transparent.

[Embodiment 2]

Referring to FIGS. 10 through 15, the following description will discuss a second embodiment in accordance with the present invention. Here, for convenience, members of the present embodiment that have the same arrangement and function as members of the previous embodiment, and that are mentioned in the previous embodiment are indicated by the same reference numerals and description thereof is omitted.

Figure 10:
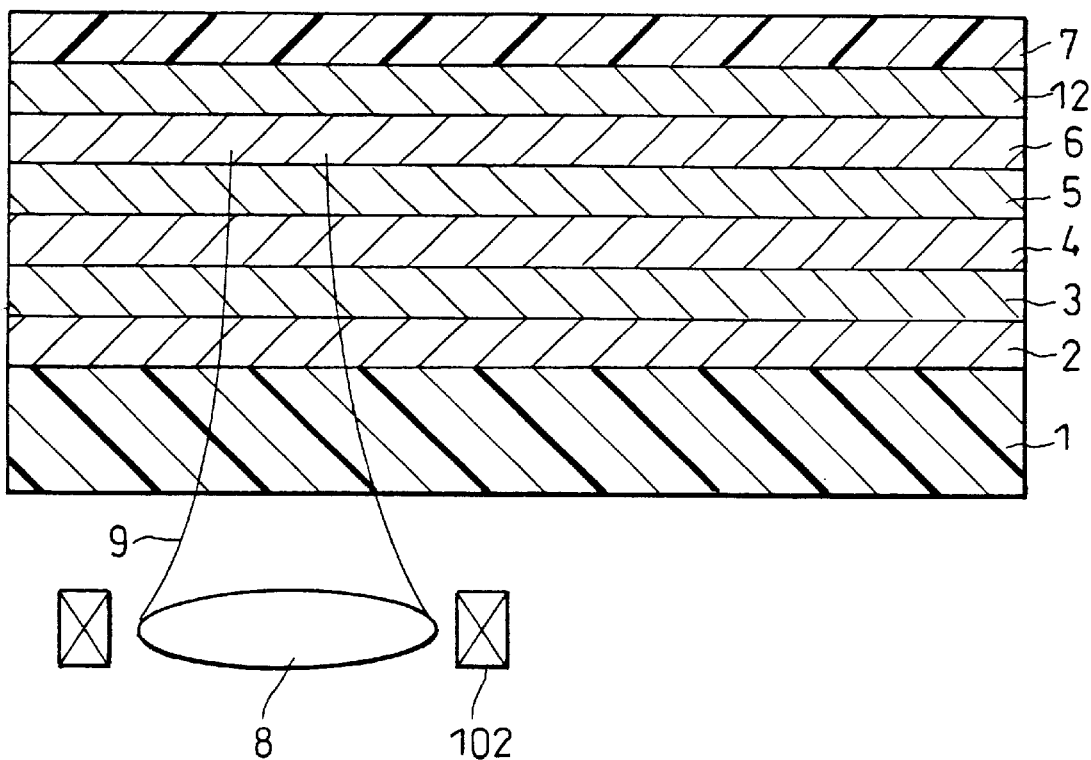
FIG. 10 is a schematic view illustrating a data storing mechanism of a storage medium of the second embodiment in accordance with the present invention by using a magneto-optical disc device that emits light from the side on which the substrate is provided.

FIG. 10 is a schematic view illustrating a magneto-optical disc device (magneto-optical storage device) and a storage medium of the present embodiment. The storage medium includes a translucent dielectric layer 2, a storage layer 3, a non-magnetic layer 4, a storage supplementary layer 5, an anti-oxidation layer 6, a ferromagnetism material layer 12, and a protection layer 7 provided in this order on a substrate 1. The ferromagnetism material layer 12 is made of iron and has a thickness of 0.3 μm, and the other layers are the same as those in the first embodiment.

In the above-mentioned magneto-optical disc device, a magnetic head constituted by a coil 102 with no magnetic core therein is disposed on the same side as the optical head including an objective lens 8 with respect to the storage medium. The coil 102 is disposed to surround the objective lens 8 to ensure a light passage for the light beam 9.

Figure 11:
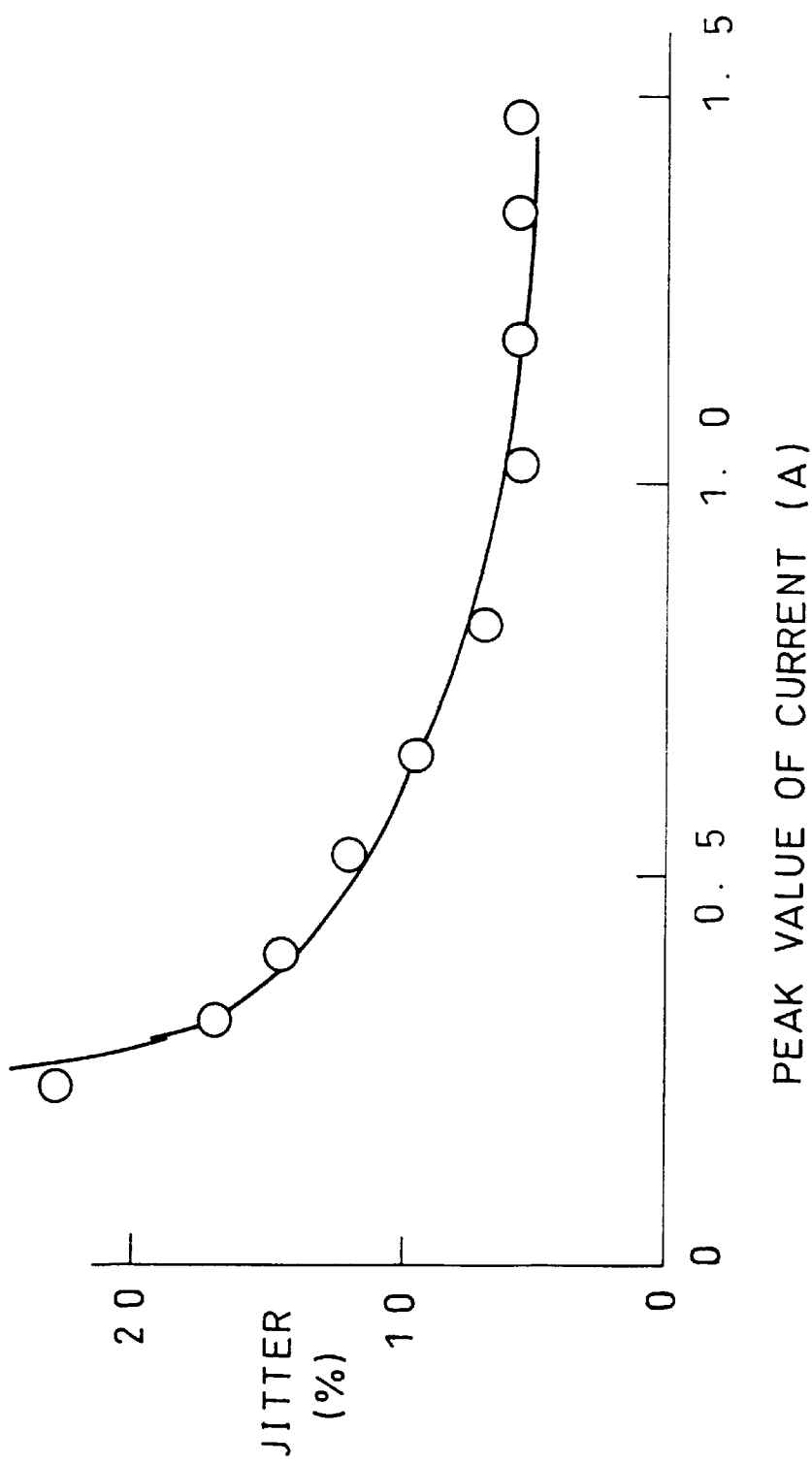
FIG. 11 is a graph showing storing sensitivity of the storage medium.

FIG. 11 is a graph showing the relationship between the peak values of a high frequency current passing through the coil 102 and the jitters. It is understood from the graph that the current value should be 0.8 A or greater to reduce the magnitude of the jitter sufficiently to such a level to enable good storing. Information is stored under the same conditions as in the first embodiment, whereupon the laser power required for the storing is about 14 mW.

Figure 12:
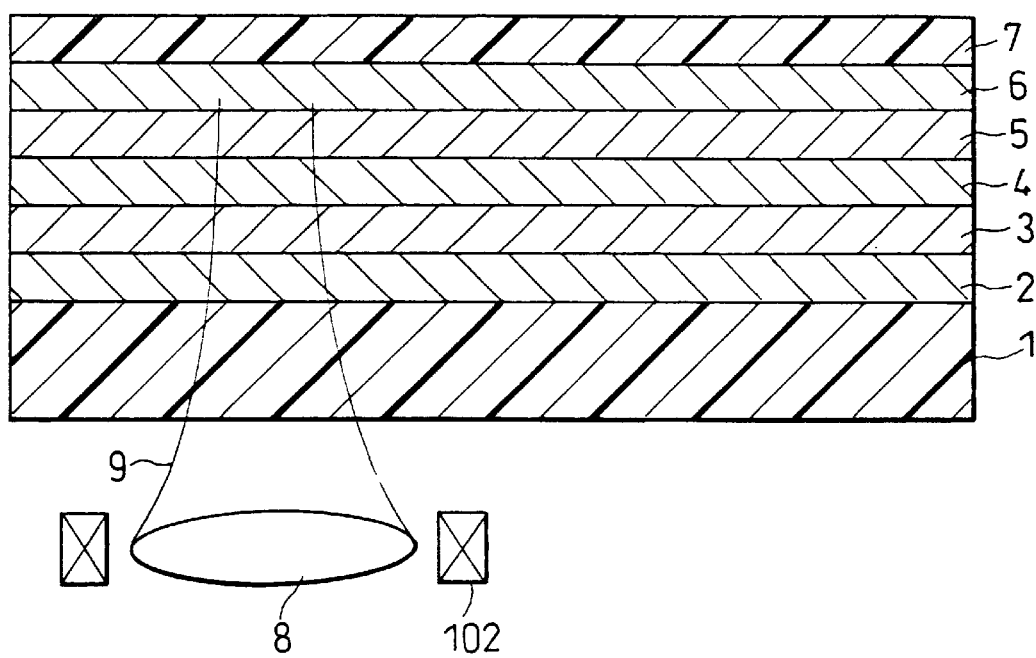
FIG. 12 is a schematic view illustrating a data storing mechanism of a storage medium of the first embodiment in accordance with the present invention by using the magneto-optical disc device.

Next, for comparative purposes, FIG. 12 is a schematic view illustrating experimental storing on a storage medium of the first embodiment under the same conditions as the present embodiment, by using the same type of magneto-optical disc device as the one in accordance with the present embodiment.

FIG. 13 shows the relationship between the peak values of a high frequency current passing through the coil 102 and the jitters. It is understood from the graph that the current value should be 1.0 A or greater to reduce the magnitude of the jitter sufficiently to such a level to enable good storing. The laser power required for this case is about 12 mW, which is smaller than the current value required in the present embodiment.

As noted above, if a magneto-optical disc device is used in which a magnetic head is disposed on the same side as the optical head with respect to the storage medium, the storage medium of the present embodiment needs an even smaller current value, than that of the first embodiment, to produce a sufficient magnetic field to store information. Therefore, there is no need to supply a large flow of current to the coil, and thereby allowing the production of the coil with thinner copper wires than conventional ones and the reduction of the coil in size.

The following description will explain the reason why the storage medium of the present embodiment needs a smaller current value, than that of the first embodiment, to reduce the magnitude of the jitter sufficiently to such a level to enable good storing.

Figure 14A:
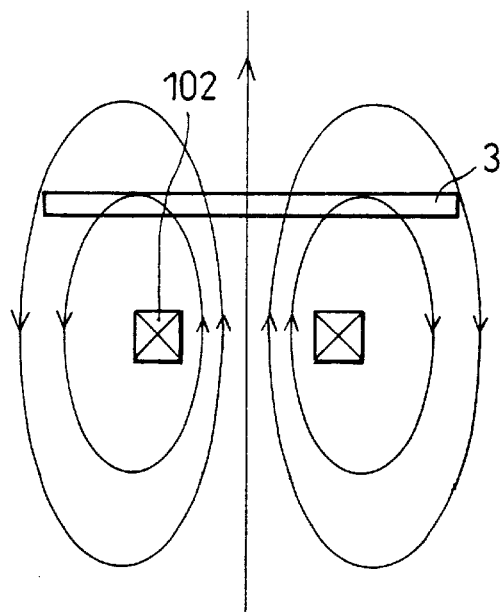
FIG. 14(a) is a schematic view illustrating magnetic lines around a storage medium having no ferromagnetic material layer.
Figure 14B:
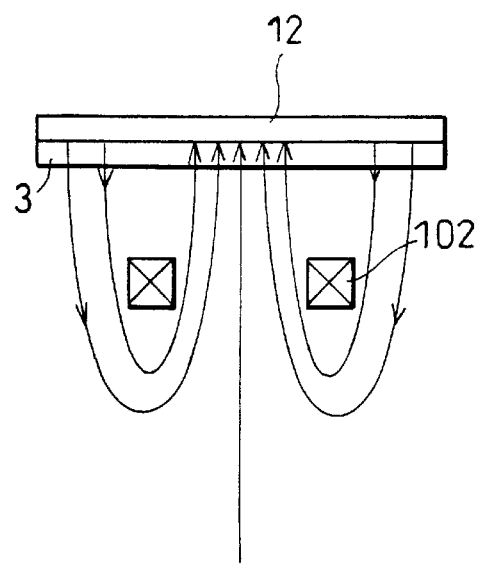
FIG. 14(b) is a schematic view illustrating magnetic lines around a storage medium having a ferromagnetic material layer.

FIG. 14(a) is a schematic view illustrating magnetic lines around a storage medium having no ferromagnetic material layer (first embodiment), and FIG. 14(b) is a schematic view illustrating magnetic lines around a storage medium having a ferromagnetic material layer 12 (present embodiment). The same current passes through the coil 102 in the cases of FIG. 14(a) and FIG. 14(b). Owing to the existence of the ferromagnetic material layer 12, the storage medium shown in FIG. 14(b) causes concentration of a magnetic flux, and therefore produces a greater magnetic field at the position of the storage layer 3 than the storage medium having no ferromagnetic material layer shown in FIG. 14(a). In other words, the storage medium of the present embodiment, being provided with the ferromagnetism material layer 12, can produce a magnetic field that reduces the magnitude of the jitter sufficiently to such a level to enable good storing with a smaller current value than a storage medium not provided with the ferromagnetism material layer 12.

Here the laser power required for the storing in the present embodiment is greater than in the case where the storage medium of the first embodiment is used, because a greater power is needed to raise the temperature of the storage layer 3 to a proximity of the Curie point of the storage layer 3 due to leak of heat to the ferromagnetism material layer 12.

As noted above, the storage medium of the present embodiment causes concentration of a magnetic flux due to the provision of the ferromagnetic material layer 12, produces a greater magnetic field at the position of the storage layer 3, is capable of storing information with a smaller external magnetic field, and moreover enables information to be stored by using a magneto-optical disc device in which optical and magnetic heads are disposed on the same side with respect to the aforementioned storage medium.

Figure 15:
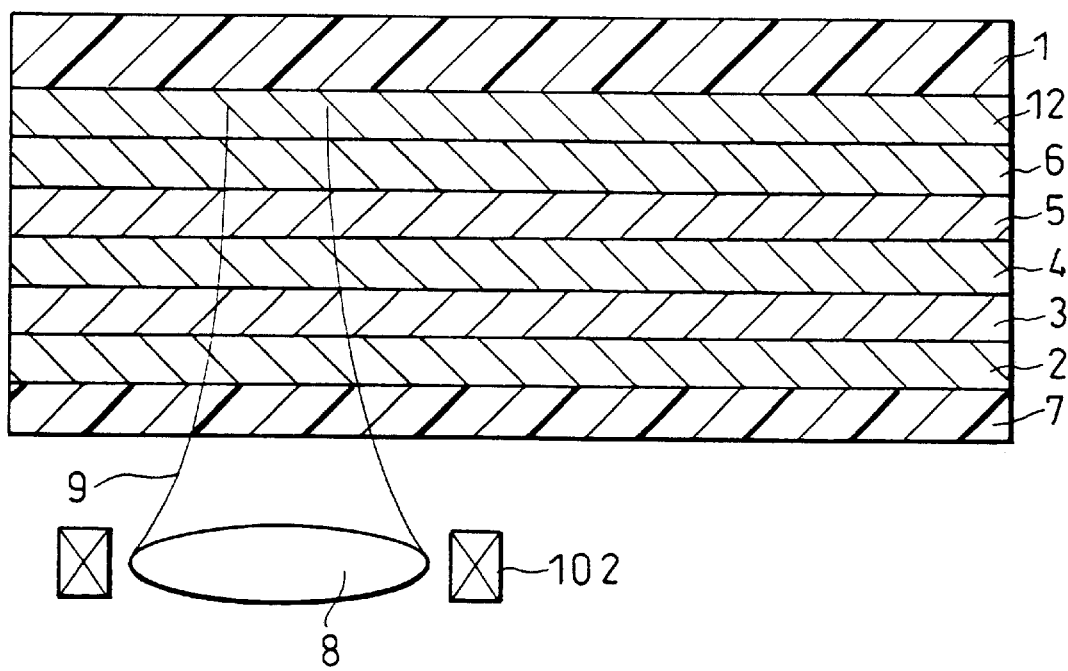
FIG. 15 is a schematic view illustrating a data storing mechanism of a storage medium, which is a variant of the second embodiment in accordance with the present invention, by using a magneto-optical disc device that emits light from the side on which the protection layer is provided.

It should be noted that the same advantages as with the arrangement shown in FIG. 10 can be achieved with the arrangement shown in FIG. 15 where information is stored and reproduced on a storage medium that includes a ferromagnetic material layer 12, an anti-oxidation layer 6, a storage supplementary layer 5, a non-magnetic layer 4, a storage layer 3, a translucent dielectric layer 2, and a protection layer 7 provided in this order on a substrate 1, using a light beam 9 emitted from the side on which the protection layer 7 is provided. Also with the arrangement shown in FIG. 15, since the light beam 9 is incident to the side on which the protection layer 7 is provided, the substrate 1 is not necessarily a translucent substrate. Moreover, since the protection layer 7 is thinner than the substrate 1, the magnetic head can be moved closer to the storage layer 3 than with the arrangement shown in FIG. 10, and hence the resultant magnetic field at the position of the storage layer can be made greater, or the current passing through the coil can be made smaller.

[Embodiment 3]

Referring to FIGS. 10 and 15 through 18, the following description will discuss a third embodiment in accordance with the present invention. Here, for convenience, members of the present embodiment that have the same arrangement and function as members of the previous embodiments, and that are mentioned in the previous embodiments are indicated by the same reference numerals and description thereof is omitted.

A magneto-optical disc device and a storage medium of the present embodiment are shown in FIG. 10 that was referred to in the second embodiment, and share the same arrangement with those in the second embodiment except that the ferromagnetism material layer 12 is made of a permalloy that is a soft magnetic material and has a thickness of 0.3 μm.

Figure 16:
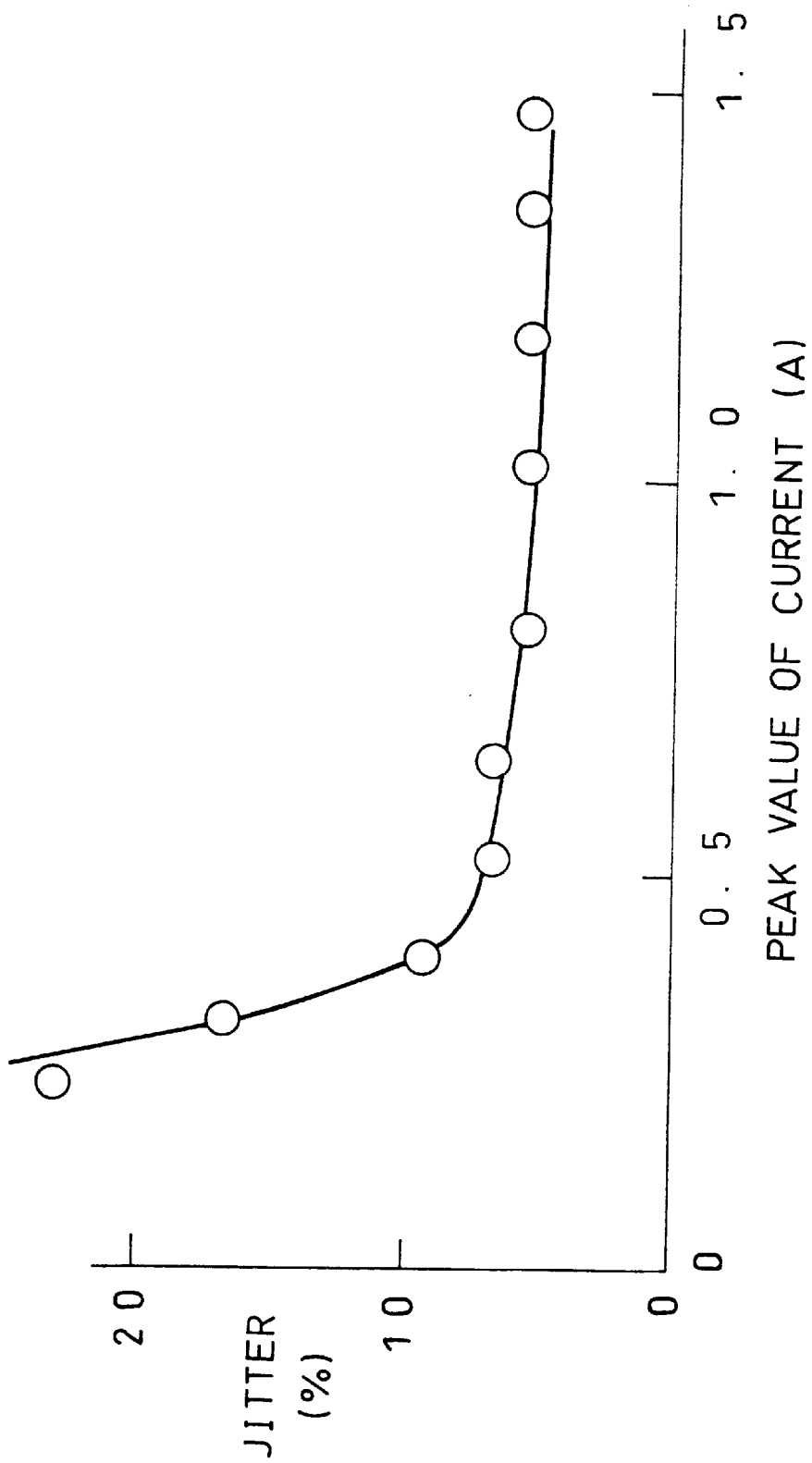
FIG. 16 is a graph showing storing sensitivity of a storage medium of the third embodiment in accordance with the present invention.

FIG. 16 is a graph showing the relationship between the peak values of a high frequency current passing through the coil 102 and the jitters. It is understood from the graph that with the storage medium of the present embodiment, the current value should be 0.5 A or greater to reduce the magnitude of the jitter sufficiently to such a level to enable good storing.

The current value required to enable good storing with the storage medium of the present embodiment is smaller than that with the storage medium of the second embodiment, because a permalloy having a greater permeability is used for the ferromagnetism material layer 12 in the storage medium of the present embodiment. The storage medium of the present embodiment causes further concentration of a magnetic flux due to the provision of the permalloy, and becomes capable of storing information with a smaller current. The laser power required for the storing is about 14 mW, which is equal to the case in the second embodiment.

Figure 17:
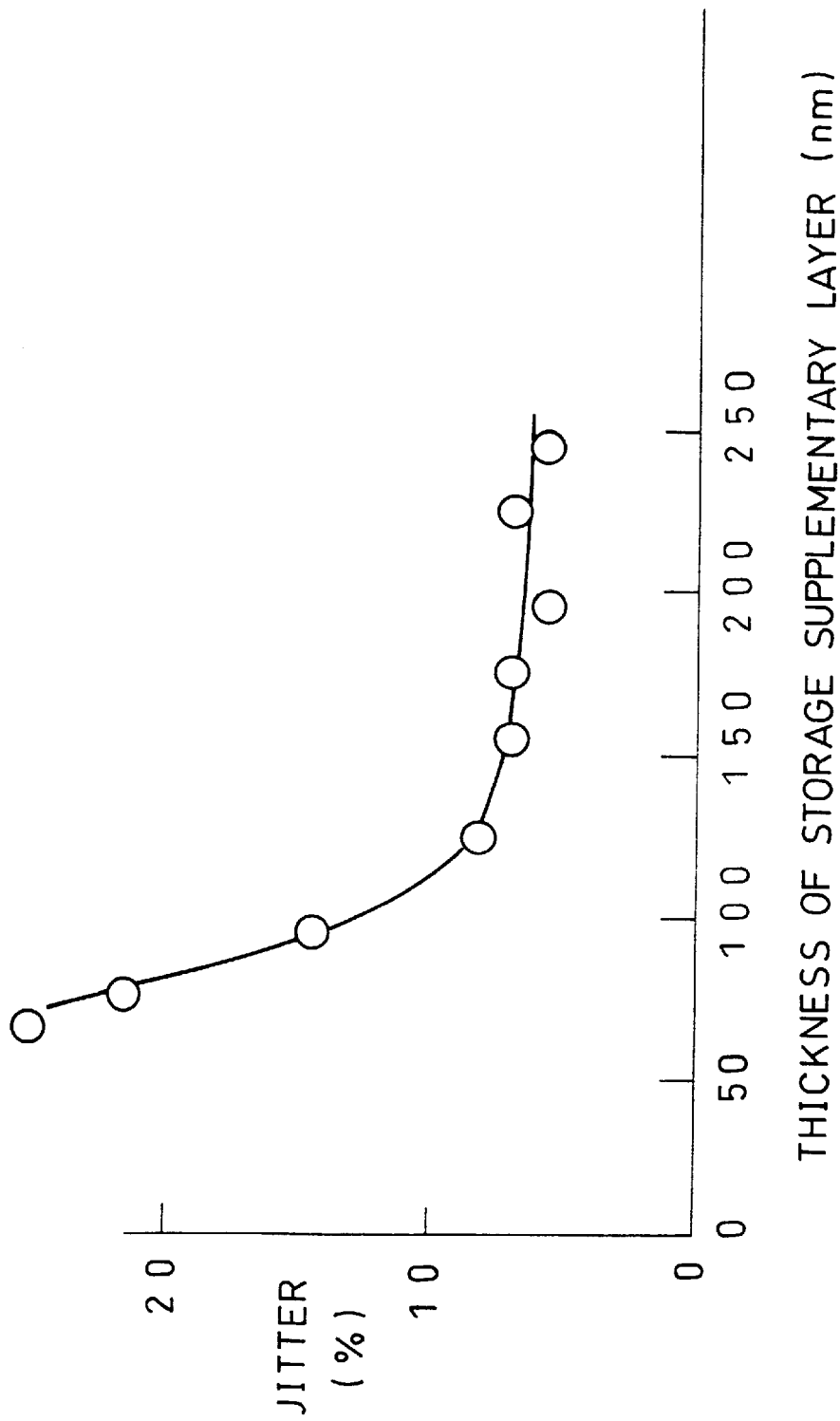
FIG. 17 is a graph showing the relationship between the thicknesses of a storage supplementary layer and the jitters of the storage medium.
Figure 18:
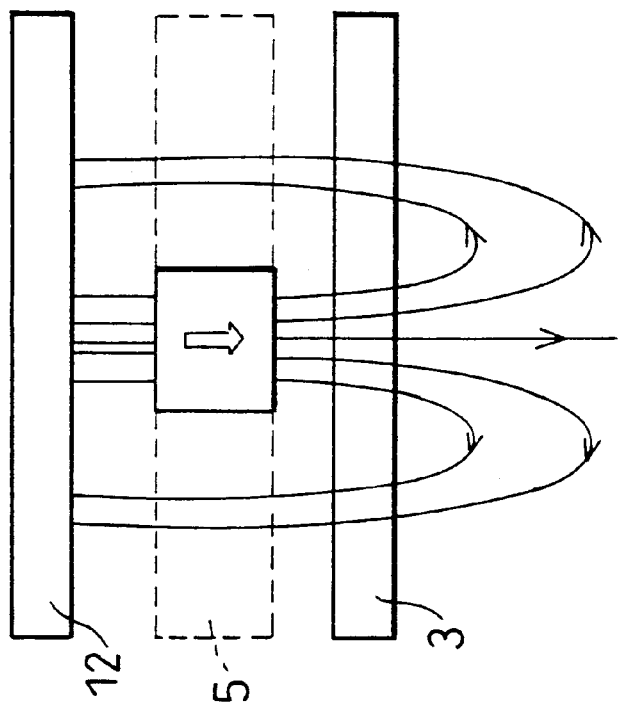
FIG. 18(a) is a schematic view illustrating magnetic lines produced by a storage supplementary layer of a storage medium having no ferromagnetic material layer.
FIG. 18(b) is a schematic view illustrating magnetic lines produced by a storage supplementary layer of a storage medium having a ferromagnetic material layer.
Figure 18:
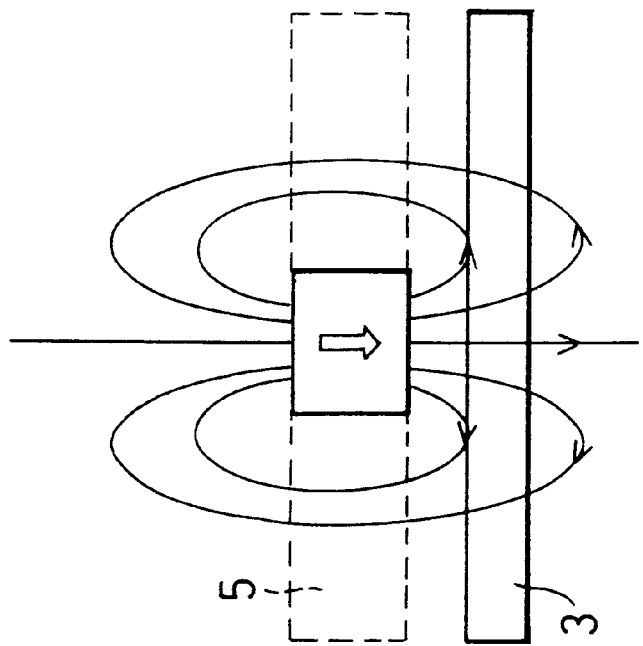

Next, FIG. 17 shows results of examination of the relationship between the thicknesses of a storage supplementary layer 5 and the jitters with the peak value of the current passing through the coil 102 set to 0.5 A. It is understood that setting the thickness of the storage supplementary layer 5 to about 120 nm or greater reduces the magnitude of the jitter sufficiently to such a level to enable good storing. Therefore, it is understood from the comparison of FIG. 8 to FIG. 17 that the storage medium of the present embodiment enables sufficiently good storing with a thinner storage supplementary layer 5 than that of the storage medium of the first embodiment due to the provision of the ferromagnetism material layer 12 made of a permalloy having a great magnetic permeability.

To explain the advantage of the ferromagnetism material layer 12, the following description will explain differences between the magnetic fields produced with the storage medium provided with a ferromagnetism material layer 12 (present embodiment) and the storage medium not provided with a ferromagnetism material layer 12 (first embodiment). FIG. 18(a) is a schematic view illustrating magnetic lines produced by the storage supplementary layer 5 of a storage medium having no ferromagnetic material layer 12 (first embodiment), and FIG. 18(b) is a schematic view illustrating magnetic lines produced by the storage supplementary layer 5 of a storage medium having a ferromagnetic material layer 12 (present embodiment). The storage supplementary layers 5 in FIGS. 18(a) and 18(b) have the same thickness and magnetic moment. In the case of FIG. 18(b), the existence of the ferromagnetic material layer 12 causes concentration of a magnetic flux produced by the storage supplementary layer 5, and therefore produces a greater magnetic field at the position of the storage layer 3 than in the case of FIG. 18(a). In other words, the existence of the ferromagnetic material layer 12 produces a greater magnetic field at the position of the storage layer 3 even if the thickness of the storage supplementary layer 5 is small.

In the storage medium of the present embodiment, with the thickness of the storage supplementary layer 5 set to 120 nm, the laser power required for the storing is about 12 mW, which is smaller than in the case of the second embodiment, because a smaller amount of heat is needed to heat the thinner storage supplementary layer 5.

As detailed above, the storage medium of the present embodiment causes further concentration of a magnetic flux due to the provision of the ferromagnetism material layer 12 made of a soft magnetic material, and therefore enables information to be stored by using a magneto-optical disc device in which optical and magnetic heads are disposed on the same side with respect to the aforementioned storage medium. Moreover, the storage medium is capable of storing information with a smaller magnetic field, further reducing power consumption upon driving the device.

It should be noted that the same advantages can be achieved with the arrangement shown in FIG. 15 where information is stored and reproduced on a storage medium that includes a ferromagnetism material layer 12 made of a permalloy, an anti-oxidation layer 6, a storage supplementary layer 5, a non-magnetic layer 4, a storage layer 3, a translucent dielectric layer 2, and a protection layer 7 provided in this order on a substrate 1, using a light beam 9 emitted from the side on which the protection layer 7 is provided. Also with the arrangement shown in FIG. 15, since the light beam 9 is incident to the side on which the protection layer 7 is provided, the substrate 1 is not necessarily a translucent substrate. Moreover, since the protection layer 7 is thinner than the substrate 1, the magnetic head can be moved closer to the storage layer 3 than with the arrangement shown in FIG. 10, and hence the resultant magnetic field at the position of the storage layer can be made greater, or the current passing through the coil can be made smaller.

[Embodiment 4]

Figure 19:
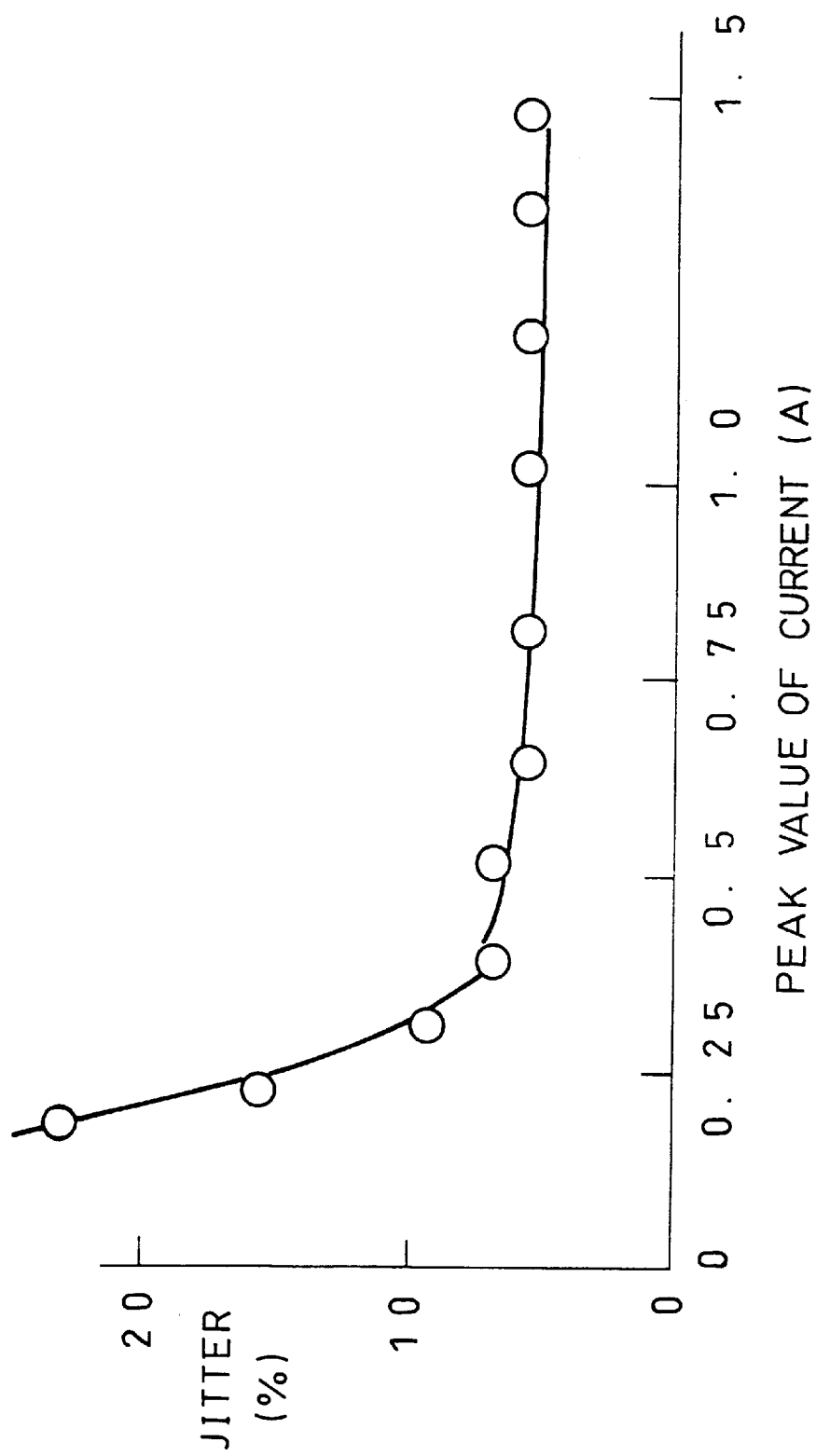
FIG. 19 is a graph showing storing sensitivity of a storage medium of the fourth embodiment in accordance with the present invention.

Referring to FIGS. 10, 15 and 19, the following description will discuss a fourth embodiment in accordance with the present invention. Here, for convenience, members of the present embodiment that have the same arrangement and function as members of the previous embodiments, and that are mentioned in the previous embodiments are indicated by the same reference numerals and description thereof is omitted.

A magneto-optical disc device and a storage medium of the present embodiment are shown in FIG. 10 that was referred to in the third embodiment, and share the same arrangement with those in the third embodiment except that the storage supplementary layer 5 has a thickness of 120 nm and that the anti-oxidation layer 6 is made of ZnS.

FIG. 19 is a graph showing the relationship between the peak values of a high frequency current passing through the coil 102 and the jitters. It is understood from the graph that the current value should be 0.35 A or greater in the storage medium of the present embodiment to reduce the magnitude of the jitter sufficiently to such a level to enable good storing. Therefore, it is understood from the comparison of FIG. 19 to FIG. 16 referred to in the third embodiment that the storage medium of the present embodiment can realise better storing with a smaller current than the storage medium of the third embodiment.

The laser power required for the storing onto the storage medium of the present embodiment is about 9 mW, which is smaller than in the case where the storage medium of the third embodiment is used. The reduction in the required laser power is because ZnS has a heat conductivity of $0.007 \times 10^{-4}$ J/um/° C./sec, whereas AlN constituting the anti-oxidation layer 6 in the third embodiment has a heat conductivity of $0.633 \times 10^{-4}$ J/um/° C./sec; with ZnS, there is less heat leak to the ferromagnetism material layer 12 due to its smaller heat conductivity, and a smaller amount of heat is required to heat the storage layer 3 and the storage supplementary layer 5.

It is probable that a substantially smaller magnetic field is capable of storing information onto the storage medium of the present embodiment, because, compared to the storage medium of the third embodiment, the existence of the anti-oxidation layer 6 made of ZnS prevents the ferromagnetism material layer 12 made of a permalloy from becoming hot and allows the ferromagnetism material layer 12 to have a great magnetic permeability.

As noted above, the storage medium of the present embodiment can heat the storage layer 3 and the storage supplementary layer 5 with little heat leaking to the ferromagnetism material layer 12 due to the provision of the anti-oxidation layer 6 that has a lower heat conductivity than the non-magnetic layer 4. In other words, the storage medium of the present embodiment prevents the ferromagnetism material layer 12 from becoming hot, allows the ferromagnetism material layer 12 to have a great magnetic permeability, therefore has a higher storing sensitivity to a magnetic field, and can store information with a smaller magnetic field. Additionally, in the above-noted storage medium, a less laser power is required for the storing, enabling a further cut in power consumption. The same advantages as those above can be achieved with the arrangement shown in FIG. 15 owing to the provision of the anti-oxidation layer 6 that has a lower heat conductivity than the non-magnetic layer 4.

[Embodiment 5]

Figure 20:
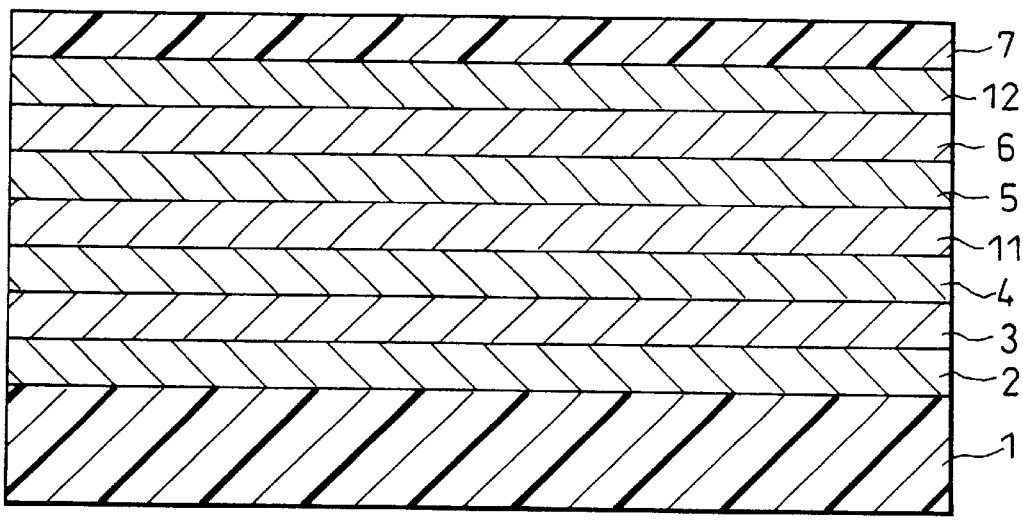
FIG. 20 is a cross-sectional view showing a storage medium of the fifth embodiment in accordance with the present invention.
Figure 21:
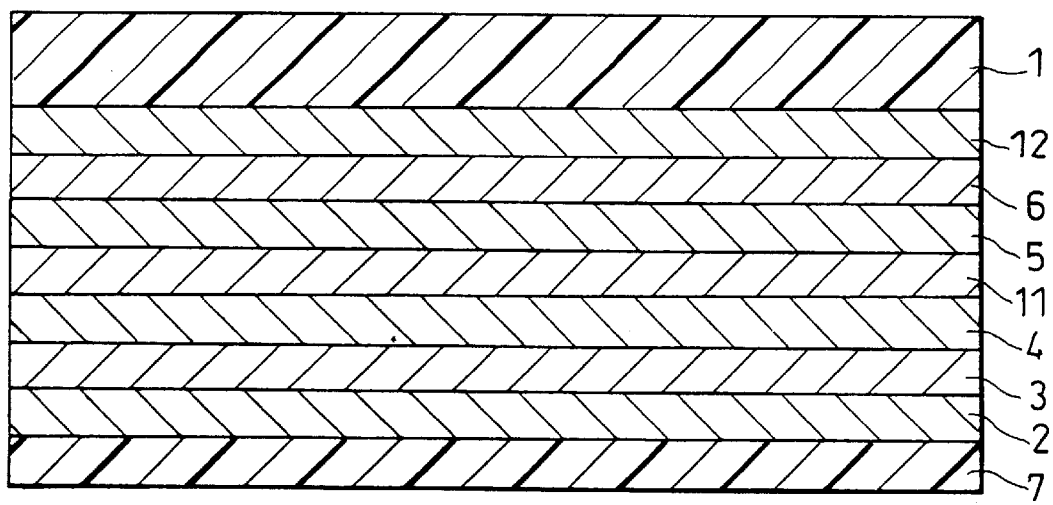
FIG. 21 is a cross-sectional view showing a storage medium, which is a variant of the fifth embodiment in accordance with the present invention, such that information is stored thereon by light emitted from the side on which the protection layer is provided.

Referring to FIGS. 20 and 21, the following description will discuss a fifth embodiment in accordance with the present invention. Here, for convenience, members of the present embodiment that have the same arrangement and function as members of the previous embodiments, and that are mentioned in the previous embodiments are indicated by the same reference numerals and description thereof is omitted.

As shown in FIG. 20, a storage medium of the present embodiment includes a translucent dielectric layer 2, a storage layer 3, a non-magnetic layer 4, a reflective layer 11, a storage supplementary layer 5, an anti-oxidation layer 6, a ferromagnetism material layer 12, and a protection layer 7 provided in this order on a substrate 1. The substrate 1 is preferably a translucent substrate, and in the present embodiment is made of a polycarbonate. The reflective layer 11 is an Al alloy and has a thickness of 10 nm. The other layers are the same as those in the fourth embodiment. Since the reflective layer 11 is made of a non-magnetic material, the storage supplementary layer 5 gives the same magnetic advantages on the storage layer 3 as those in the above-mentioned case of the first embodiment. In the magneto-optical disc device of the present embodiment, the optical head and the magnetic head are disposed on the side on which the substrate 1 is provided, in the same manner as in the arrangement shown in FIG. 10 in the second embodiment.

The arrangement, called a reflective film structure, improves signal quality of reproduced signals by apparently enhancing the magneto-optical effect using multiple reflection of light between, for example, the storage layer 3 and the reflective layer 11. Adopting the reflective film structure can improve signal quality of reproduced signals also in the storage medium of the present embodiment.

It should be noted that the same advantages as with the arrangement shown in FIG. 20 can be achieved with the arrangement shown in FIG. 21 where information is stored and reproduced on a storage medium that includes a ferromagnetism material layer 12, an anti-oxidation layer 6, a storage supplementary layer 5, a reflective layer 11, a non-magnetic layer 4, a storage layer 3, a translucent dielectric layer 2, and a protection layer 7 provided in this order on a substrate 1, using a light beam emitted from the side on which the protection layer 7 is provided. Also with the arrangement shown in FIG. 21, since the light beam is incident to the side on which the protection layer 7 is provided, the substrate 1 is not necessarily a translucent substrate. Moreover, since the protection layer 7 is thinner than the substrate 1, the magnetic head can be moved closer to the storage layer 3 than with the arrangement shown in FIG. 20, and hence the resultant magnetic field at the position of the storage layer 3 can be made greater, or the current passing through the coil can be made smaller.

[Embodiment 6]

Figure 22:
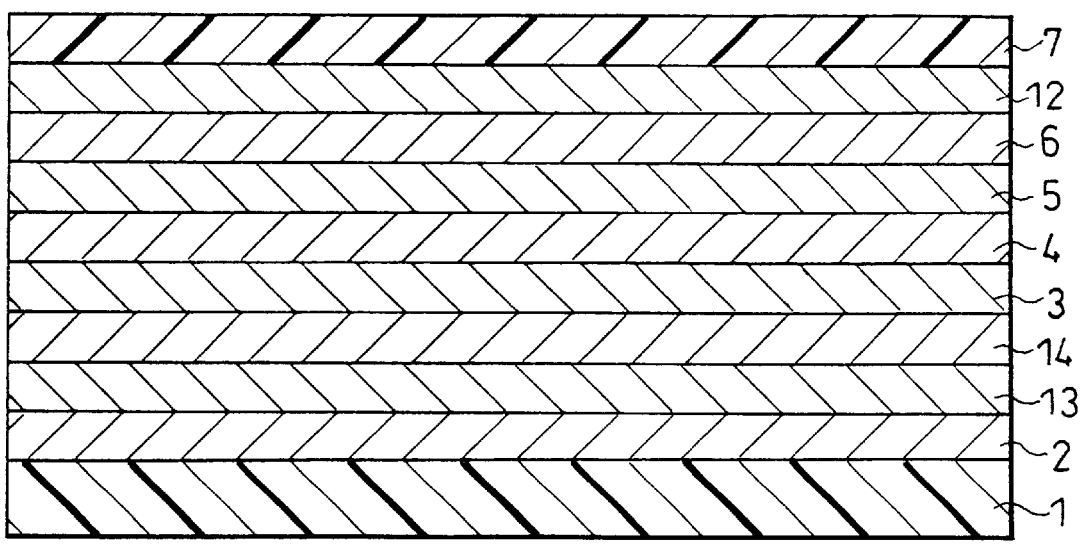
FIG. 22 is a cross-sectional view showing a storage medium of the sixth embodiment in accordance with the present invention.
Figure 23:
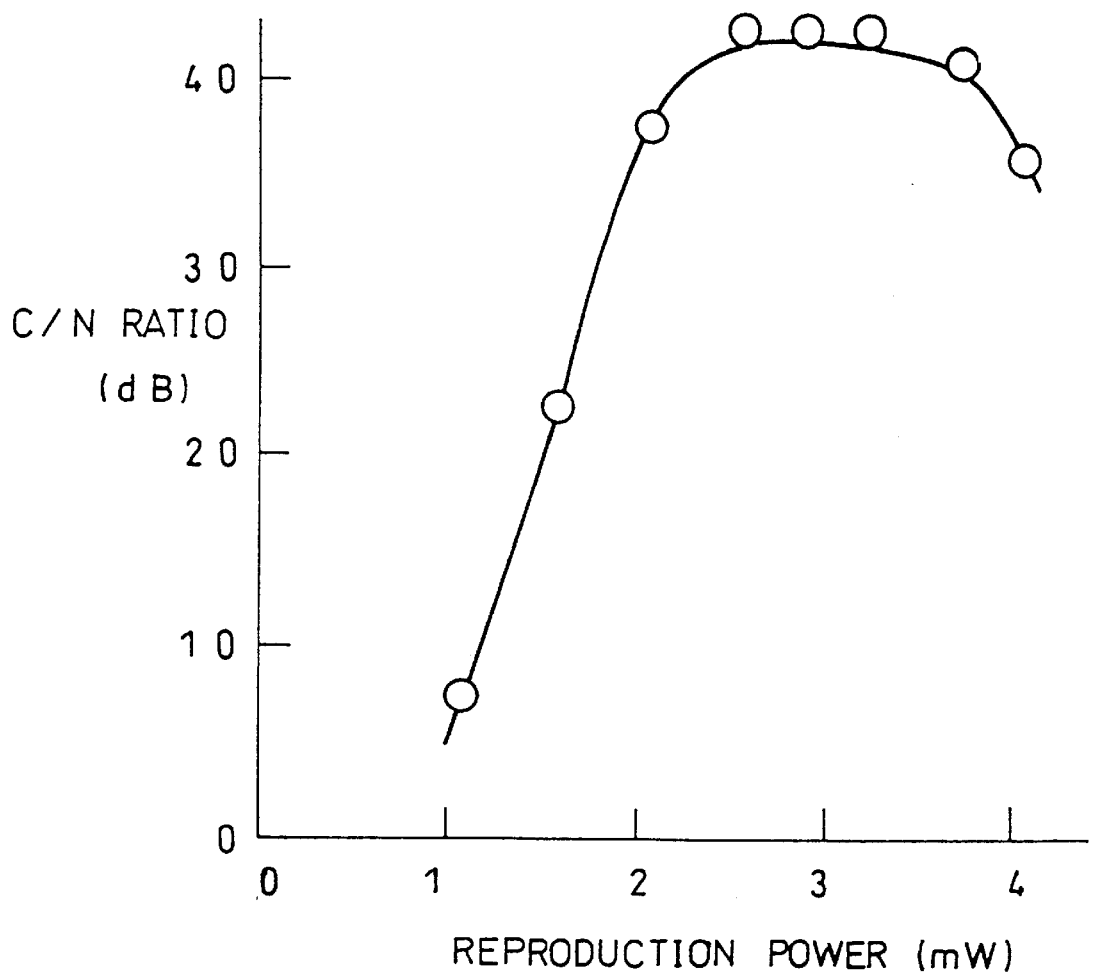
FIG. 23 is a graph showing the relationship between a reproduction power and C/N ratio of the storage medium.

Referring to FIGS. 22 and 23, the following description will discuss a sixth embodiment in accordance with the present invention. Here, for convenience, members of the present embodiment that have the same arrangement and function as members of the previous embodiments, and that are mentioned in the previous embodiments are indicated by the same reference numerals and description thereof is omitted.

As shown in FIG. 22, a storage medium of the present embodiment includes a translucent dielectric layer 2, a reproduction layer 13, a non-magnetic intermediate layer 14, a storage layer 3, a non-magnetic layer 4, a storage supplementary layer 5, an anti-oxidation layer 6, a ferromagnetism material layer 12, and a protection layer 7 provided in this order on a substrate 1. The reproduction layer 13 is made of GdFeCo and has a thickness of 40 nm, and is specified such that the magnetisation thereof is in-plane at room temperature and changes the orientation thereof to right angles at higher temperatures. The non-magnetic intermediate layer 14 is made of AlN and has a thickness of 10 nm. The other layers are the same as those in the fourth embodiment.

Since the storage layer 3 has magnetic properties as shown in FIG. 2, in a reproduction operation, regions of the storage layer 3 heated to high temperatures produce a magnetic flux. The reproduction layer 13 exhibits a perpendicular magnetisation at high temperatures in the reproduction operation. However, whether the magnetisation is oriented upward or downward depends on the orientation of the magnetic lines produced by the storage layer 3. By contrast, regions of the reproduction layer 13 exhibit an in-plane magnetisation w here the reproduction layer 13 is not heated.

As noted above, it becomes possible to transfer the information (orientation of the magnetisation) on the storage layer 3 to the reproduction layer 13 and hence reproduce the information only at those region where the temperature is high in the reproduction operation. In other words, high temperature regions having a smaller area than a beam spot are reproduced, improving reproduction resolution.

FIG. 23 is a graph showing the relationship between a C/N ratio and a reproduction power when a single frequency signal having a mark length of 0.3 $\mu$m is written on the storage medium of the present embodiment and then reproduced. If the reproduction power is specified to a proper value (in a range of about 2 mW to 4 mW), a high temperature region is created, and the C/N ratio becomes greater.

The above-noted reproduction method is a well-known magnetic super resolution method, which can be applied to the storage medium of the present embodiment to improve the reproduction resolution by causing magnetic super resolution between the storage layer 3 and the reproduction layer 13 and thus achieve high density storage.

As noted above, the storage medium of the present embodiment improves reproduction resolution and achieves high density storage, because the provision of the reproduction layer 13 enables the information stored in the storage layer 3 to be transferred to the reproduction layer 13 and then reproduced only at those regions where the temperature is high in the reproduction operation, i.e., only at high temperature regions having a smaller area than a beam spot.

[Embodiment 7]

Figure 24:
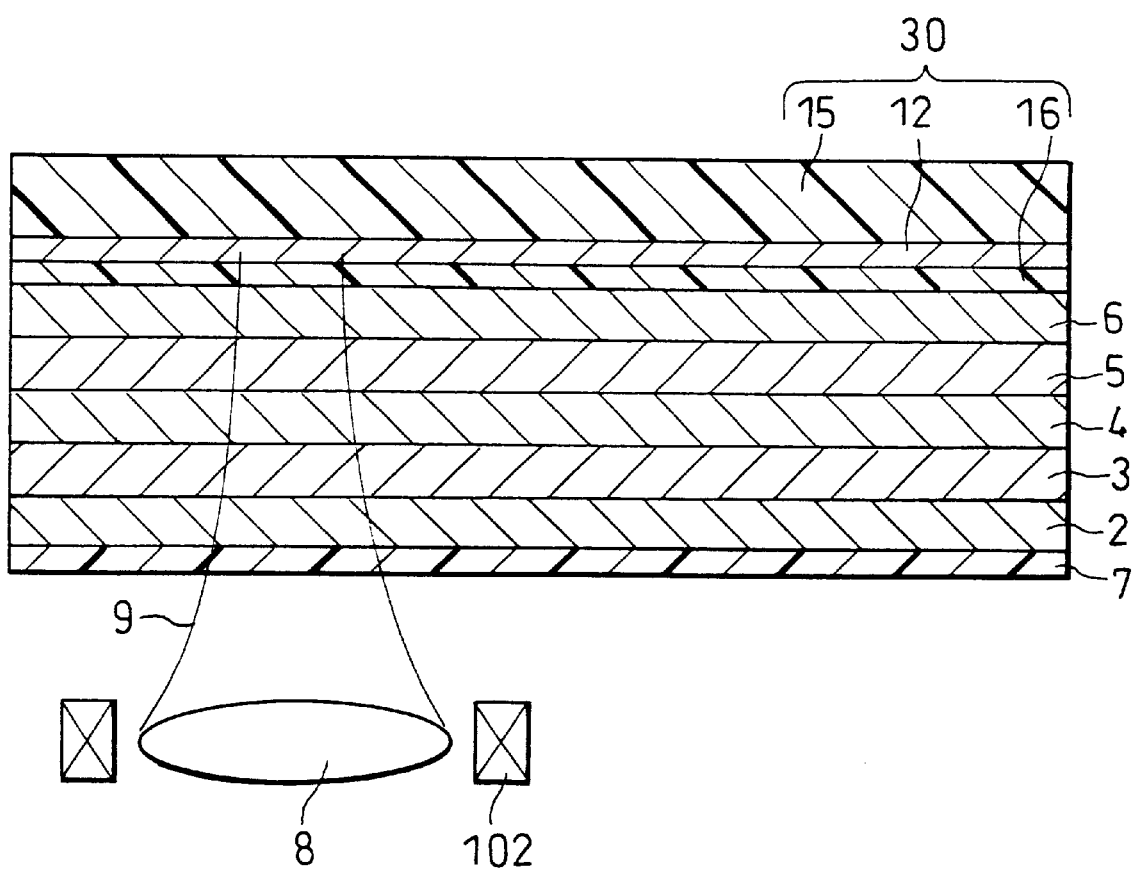
FIG. 24 is a cross-sectional view showing a storage medium of the seventh embodiment in accordance with the present invention such that information is stored thereon by light emitted from the side on which the protection layer is provided.

Referring to FIG. 24, the following description will discuss a seventh embodiment in accordance with the present invention. Here, for convenience, members of the present embodiment that have the same arrangement and function as members of the previous embodiments, and that are mentioned in the previous embodiments are indicated by the same reference numerals and description thereof is omitted.

As shown in FIG. 24, a storage medium of the present embodiment includes a ferromagnetism material layer 12 formed on a planar substrate 15 by sputtering and a 2 P layer 16 having a groove formed with a 2 P method (photo polymer method) after the formation of the ferromagnetism material layer 12, which acts as a disc substrate 30.

The storage medium includes an anti-oxidation layer 6, a storage supplementary layer 5, a non-magnetic layer 4, a storage layer 3, a translucent dielectric layer 2, and a protection layer 7 provided in this order on the disc substrate 30.

The planar substrate 15 is made of a polycarbonate. The ferromagnetism material layer 12 is a permalloy and has a thickness of 0.3 $\mu$m. The protection layer 7 is a translucent resin and has a thickness of 0.1 nm. The other layers are the same as those in the fourth embodiment. For the storing and reproducing on the storage medium, a magneto-optical disc device is used in which the optical head and the magnetic head are both disposed on the side on which the protection layer 7 is provided, with a light beam emitted from the side on which the protection layer 7 is provided.

The ferromagnetic material layer 12 causes concentration of a magnetic flux, and therefore produces a greater magnetic field at the position of the storage layer 3 as mentioned in the second embodiment. Moreover, since the protection layer 7 is thinner than the disc substrate 30, the magnetic head can be moved closer to the storage layer 3, the storage supplementary layer 5, and the ferromagnetism material layer 12 by using a magneto-optical disc device in which optical and magnetic heads are both disposed on the side on which the protection layer 7 is provided, and hence further strengthens the magnetic field at the position of the storage layer 3. Accordingly, the storage medium of the present embodiment can produce a magnetic field that reduces the magnitude of the jitter sufficiently to such a level to enable good storing with a smaller current, and can achieve a good storing sensitivity as that in the fourth embodiment.

As noted above, the storage medium of the present embodiment is capable of storing information with a smaller magnetic field, because the magnetic field at the position of the storage layer 3 is strengthened due to the inclusion of the ferromagnetism material layer 12 in the disc substrate 30 and the reproduction operation by a light beam emitted from the side on which the protection layer 7 is provided.

It should be noted that although a permalloy was employed as an example of a soft magnetic material for the ferromagnetism material layers 12 of the storage media in the third to seventh embodiments, there are alternatives: soft magnetic materials other than permalloys is of course possible.

Information is stored in the first to seventh embodiments with a magnetic field modulation. Needless to say, magnetic field modulation storage allows direct overwriting of new data over old data when replacing old data with new data. The present invention not only is advantageous in magnetic field modulation storage shown in the embodiments, but also can be applied to an optical modulation storage method according to which information is stored by modulating the laser power.

As noted above, the magneto-optical storage medium in accordance with the present invention is a magneto-optical storage medium, including at least a storage layer, a non-magnetic layer, and a storage supplementary layer, the layers being formed either in this order or in reverse order on a substrate, and is characterised in that the storage supplementary layer is made of a ferrimagnetic material having a compensation temperature near room temperature and exhibiting an increased saturation magnetisation near a Curie point of the storage layer, and has a magnetisation that changes an orientation thereof at a portion of the storage supplementary layer according to a modulated external magnetic field, the portion having been heated in a storing operation.

With the above arrangement, the magnetic moment of the storage supplementary layer follows a small external magnetic field, and produces a relatively large magnetic field at the position of the storage layer. Therefore, the magnetic moment of the storage layer follows the magnetic field produced by the storage supplementary layer. In short, the magnetic moment of the storage layer follows the small external magnetic field.

This enables the magneto-optical storage medium to store information with a smaller magnetic field than a conventional magneto-optical storage medium, and the magneto-optical storage device to be driven with a reduced amount of electric power.

Alternatively, the magneto-optical storage medium in accordance with the present invention is a magneto-optical storage medium, including at least a storage layer, a non-magnetic layer, a storage supplementary layer, another non-magnetic layer, and a ferromagnetic material layer, the layers being formed either in this order or in reverse order on a substrate, and incorporates an arrangement such that the storage supplementary layer is made of a ferrimagnetic material having a compensation temperature near room temperature and exhibiting an increased saturation magnetisation near a Curie point of the storage layer, and has a magnetisation that changes an orientation thereof at a portion of the storage supplementary layer according to a modulated external magnetic field, the portion having been heated in a storing operation.

With the above arrangement, the magnetic moment of the storage supplementary layer follows a small external magnetic field, and produces a relatively large magnetic field at the position of the storage layer. Therefore, the magnetic moment of the storage layer follows the magnetic field produced by the storage supplementary layer. In short, the magnetic moment of the storage layer follows the small external magnetic field. In addition, the existence of the ferromagnetic material layer in the storage medium causes concentration of a magnetic flux, and can store information with an even smaller external magnetic field.

This enables information to be stored by using a device in which optical and magnetic heads are disposed on the same side with respect to the magneto-optical storage medium, in addition to that the magneto-optical storage medium is capable of storing information with a smaller magnetic field than a conventional magneto-optical storage medium and that the device for storing information on the magneto-optical storage medium can be driven with a reduced amount of electric power.

Moreover, preferably, the ferromagnetic material layer is made of a soft magnetic material.

With the above arrangement, owing to the adoption of a soft magnetic material, which has a great magnetic permeability, as the ferromagnetic material layer, the magneto-optical storage medium causes further concentration of a magnetic flux and can store information with an even smaller magnetic field, and the device for storing information on the magneto-optical storage medium can be driven with a further reduced amount of electric power.

Moreover, preferably, the non-magnetic layer disposed between the storage layer and the ferromagnetic material layer has a lower heat conductivity than does the non-magnetic layer disposed between the storage layer and the storage supplementary layer.

With the above arrangement, the magneto-optical storage medium can heat the storage layer and the storage supplementary layer without allowing heat to leak to the ferromagnetic material layer. Moreover, since the temperature of the ferromagnetic material layer dose not rise and the great magnetic permeability can be maintained, information can be stored on the magneto-optical storage medium with an even smaller magnetic field.

This enables the magneto-optical storage medium to have a higher storing sensitivity to the magnetic field, and the laser power required in a storing operation to be lower, allowing a further reduction in power consumption.

Alternatively, the magneto-optical storage medium in accordance with the present invention incorporates an arrangement such that a reflection layer is provided between the storage layer and the storage supplementary layer.

With the above arrangement, the magneto-optical effect becomes greater due to multiple reflection, i.e. diffraction effect, of light between the storage layer and the reflective layer, and the quality of the reproduced signals is improved upon reproduction of stored data.

Alternatively, the magneto-optical storage medium in accordance with the present invention incorporates an arrangement such that a ferromagnetic material layer is provided in the substrate.

With the above arrangement, the magneto-optical storage medium has a higher storing sensitivity to the magnetic field by emitting a light beam from the side on which the protection layer is provided, using an magneto-optical storage device in which an optical and magnetic heads are disposed on the same side as the protection layer with respect to the storage medium.

Meanwhile, the magneto-optical storage device in accordance with the present invention is a magneto-optical storage device for storing information on the magneto-optical storage medium in accordance with the present invention, and is characterised in that the magneto-optical storage device includes: an optical head; and a magnetic head that is disposed on the same side as the optical head with respect to the magneto-optical storage medium.

The magneto-optical storage device in accordance with the present invention can be fabricated in a smaller size, since the optical and magnetic heads are disposed on the same side with respect to the magneto-optical storage medium. In addition, the magneto-optical storage medium in accordance with the present invention has a sufficient sensitivity when used with a device producing a smaller magnetic field at the storing position, in which device the optical and magnetic heads are disposed on the same side with respect to the magneto-optical storage medium, since information can be stored on the magneto-optical storage medium with a smaller external magnetic field than conventionally.

This enables the magneto-optical storage device to be low in power-consuming and small in size. Another advantage is that the device can be used also with a pasted disc.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A magneto-optical storage medium, comprising:
   a storage layer having a coercive force that decreases with a rise in temperature;
   a storage supplementary layer made of a ferrimagnetic material having a compensation temperature near room temperature and exhibiting an increased saturation magnetisation near a Curie point of the storage layer, and having a magnetisation that changes an orientation thereof at a portion of the storage supplementary layer according to a modulated external magnetic field, the portion having been heated in a storing operation; and
   a first non-magnetic layer disposed between the storage layer and the storage supplementary layer.

2. The magneto-optical storage medium as defined in claim 1, further comprising
   a ferromagnetic material layer disposed, via a second non-magnetic layer, on a side of the storage supplementary layer on which the first non-magnetic layer is not provided.

3. The magneto-optical storage medium as defined in claim 2,
   wherein the ferromagnetic material layer is made of a soft magnetic material.

4. The magneto-optical storage medium as defined in claim 2,
   wherein the second non-magnetic layer is specified to have a lower heat conductivity than that of the first non-magnetic layer.

5. The magneto-optical storage medium as defined in claim 1,
   wherein a reflection layer is provided between the storage layer and the storage supplementary layer.

6. The magneto-optical storage medium as defined in claim 2,
   wherein a reflection layer is provided between the storage layer and the storage supplementary layer.

7. The magneto-optical storage medium as defined in claim 2,
   wherein a substrate including the ferromagnetic material layer is provided on a side on which the ferromagnetic material layer is provided.

8. The magneto-optical storage medium as defined in claim 1, further comprising
   a reproduction layer disposed, via a non-magnetic intermediate layer, on a side of the storage layer on which the first non-magnetic layer is not provided, the reproduction layer exhibiting a magnetisation that is in-plane at room temperature and perpendicular at high temperatures.

9. The magneto-optical storage medium as defined in claim 2, further comprising
   a reproduction layer disposed, via a non-magnetic intermediate layer, on a side of the storage layer on which the first non-magnetic layer is not provided, the reproduction layer exhibiting a magnetisation that is in-plane at room temperature and perpendicular at high temperatures.

10. The magneto-optical storage medium as defined in claim 1,
    wherein the storage supplementary layer is adjusted to have a Curie temperature higher than that of the storage layer and to have a smaller coercive force than that of the storage layer at the same temperature.

11. The magneto-optical storage medium as defined in claim 2,
    wherein the storage supplementary layer is adjusted to have a Curie temperature higher than that of the storage layer and to have a smaller coercive force than that of the storage layer at the same temperature.

12. A magneto-optical storage medium, including at least a storage layer, a non-magnetic layer, and a storage supplementary layer, the layers being formed in an arrangement in which a storage layer, a non-magnetic layer, and a storage supplementary layer are provided on a substrate in the stated order, wherein the storage supplementary layer is made of a ferrimagnetic material having a compensation temperature near room temperature and exhibiting an increased saturation magnetisation near a Curie point of the storage layer, and has a magnetisation that changes an orientation thereof at a portion of the storage supplementary layer according to a modulated external magnetic field, the portion having been heated in a storing operation.

13. A magneto-optical storage medium, including at least a storage layer, a non-magnetic layer, a storage supplementary layer, another non-magnetic layer, and a ferromagnetic material layer, the layers being formed in an arrangement in which a storage layer, a non-magnetic layer, a storage supplementary layer, a non-magnetic layer, and a ferroelectric layer are provided on a substrate in the stated order, wherein the storage supplementary layer is made of a ferrimagnetic material having a compensation temperature near room temperature and exhibiting an increased saturation magnetisation near a Curie point of the storage layer, and has a magnetisation that changes an orientation thereof at a portion of the storage supplementary layer according to a modulated external magnetic field, the portion having been heated in a storing operation.

14. A magneto-optical storage device for storing information on a magneto-optical storage medium including: a storage layer having a coercive force that decreases with a rise in temperature; a storage supplementary layer made of a ferrimagnetic material having a compensation temperature near room temperature and exhibiting an increased saturation magnetisation near a Curie point of the storage layer, and having a magnetisation that changes an orientation thereof at a portion of the storage supplementary layer according to a modulated external magnetic field, the portion having been heated in a storing operation; a first non-magnetic layer disposed between the storage layer and the storage supplementary layer; and a ferromagnetic material layer disposed, via a second non-magnetic layer, on a side of the storage supplementary layer on which the first non-magnetic layer is not provided, said magneto-optical storage device comprising:

an optical head; and a magnetic head disposed on the same side as the optical head with respect to the magneto-optical storage medium.

15. The magneto-optical storage device as defined in claim 14, wherein the optical head and the magnetic head are disposed on the same side as the storage layer side with respect to the first non-magnetic layer of the magneto-optical storage medium.

16. The magneto-optical storage device as defined in claim 14, wherein the optical head includes an objective lens, and the magnetic head includes a coil, wherein the coil is disposed to surround the objective lens.

17. A magneto-optical storage medium, including at least a storage layer, a non-magnetic layer, and a storage supplementary layer, the layers being formed in an arrangement in which a storage supplementary layer, a non-magnetic layer, and a storage layer are provided on a substrate in the stated order, wherein the storage supplementary layer is made of a ferrimagnetic material having a compensation temperature near room temperature and exhibiting an increased saturation magnetisation near a Curie point of the storage layer, and has a magnetisation that changes an orientation thereof at a portion of the storage supplementary layer according to a modulated external magnetic field, the portion having been heated in a storing operation.

18. A magneto-optical storage medium, including at least a storage layer, a non-magnetic layer, a storage supplementary layer, another non-magnetic layer, and a ferromagnetic material layer, the layers being formed in an arrangement in which a ferroelectric layer, a non-magnetic layer, a storage supplementary layer, a non-magnetic layer, and a storage layer are provided on a substrate in the stated order, wherein the storage supplementary layer is made of a ferrimagnetic material having a compensation temperature near room temperature and exhibiting an increased saturation magnetisation near a Curie point of the storage layer, and has a magnetisation that changes an orientation thereof at a portion of the storage supplementary layer according to a modulated external magnetic field, the portion having been heated in a storing operation.

19. The magneto-optical storage medium as set forth in claim 1, wherein:

in the vicinity of the Curie point of the storage layer, a direction of a magnetization of the portion having been heated varies in accordance with the modulated external magnetic field.

20. A magneto-optical storage device for storing information with respect to a magneto-optical storage medium having a storage layer that has a coercive force that lowers with a temperature rise, a storage supplementary layer that is made of a ferrimagnetic material having a compensation temperature in the vicinity of room temperature and having saturation magnetization that increases in the vicinity of a Curie temperature of said storage layer, and a first non-magnetic layer provided between said storage layer and said storage supplementary layer, said magneto-optical storage device comprising:

an optical head for projecting a light beam to said magneto-optical storage medium; and a magnetic head for, upon a storing operation, applying a modulated magnetic field so as to change a direction of a magnetization at a portion having been heated by said light beam.

* * * * *